(12) United States Patent
Takasu et al.

(10) Patent No.: US 9,135,832 B2
(45) Date of Patent: Sep. 15, 2015

(54) ANATOMICAL MODEL FOR TRAINING AID FOR LEARNING REDUCTION TECHNIQUES AND A METHOD FOR LEARNING THE REDUCTION TECHNIQUES USING THE ANATOMICAL MODEL FOR TRAINING AID

(76) Inventors: Shuhei Takasu, Aichi (JP); Hideharu Kitada, Osaka (JP); Yoshihiko Tanabe, Osaka (JP)

( * ) Notice: Subject to any disclaimer, the term of this patent is extended or adjusted under 35 U.S.C. 154(b) by 151 days.

(21) Appl. No.: 13/811,890

(22) PCT Filed: Jul. 13, 2011

(86) PCT No.: PCT/JP2011/065969
§ 371 (c)(1),
(2), (4) Date: Jan. 23, 2013

(87) PCT Pub. No.: WO2012/011417
PCT Pub. Date: Jan. 26, 2012

(65) Prior Publication Data
US 2013/0122478 A1    May 16, 2013

(30) Foreign Application Priority Data
Jul. 23, 2010    (JP) ................................. 2010-166478

(51) Int. Cl.
*G09B 23/32* (2006.01)
*G09B 23/30* (2006.01)
*G09B 23/28* (2006.01)
*G09B 23/34* (2006.01)

(52) U.S. Cl.
CPC ................ *G09B 23/30* (2013.01); *G09B 23/28* (2013.01); *G09B 23/32* (2013.01); *G09B 23/34* (2013.01)

(58) Field of Classification Search
CPC ........ G09B 23/28; G09B 23/30; G09B 23/32; G09B 23/34
USPC .......................................................... 434/275
See application file for complete search history.

(56) References Cited

U.S. PATENT DOCUMENTS

| | | | |
|---|---|---|---|
| 4,773,865 A * | 9/1988 | Baldwin ...................... 434/268 |
| 2002/0087213 A1 | 7/2002 | Bertram | |
| 2003/0236572 A1 | 12/2003 | Bertram | |
| 2008/0286736 A1* | 11/2008 | Browne-Wilkinson ....... 434/274 |

FOREIGN PATENT DOCUMENTS

| EP | 260935 A1 | 7/2013 |
|---|---|---|
| EP | 11809591.8-1958 | 1/2014 |
| JP | 2007272115 A | 10/2007 |

(Continued)

*Primary Examiner* — Xuan Thai
*Assistant Examiner* — Robert P Bullington
(74) *Attorney, Agent, or Firm* — Rahman LLC

(57) ABSTRACT

A method for learning reduction techniques using an anatomical model for training aid is provided. The method for learning the reduction techniques uses the anatomical model for training aid which comprises bone members, the bone members comprising a first bone member and a second bone member, either one of the first bone member or the second bone member being provided with a magnet and the other being provided with a magnet material, and has two connection statuses including a normal connection status where the first bone member and the second bone member are connected in a status similar to a normal connection status of human bones and an abnormal connection status where they are connected in a status different from the normal connection status of human bones.

5 Claims, 22 Drawing Sheets

(56) References Cited

FOREIGN PATENT DOCUMENTS

| JP | 3144317 | U | 8/2008 |
|----|---------|---|--------|
| JP | 3157322 | U | 2/2010 |
| SU | 1651317 | A1 | 5/1991 |
| TW | 201102115 | A | 1/2011 |
| WO | 2008057565 | A2 | 5/2008 |

\* cited by examiner

ANATOMICAL MODEL FOR TRAINING AID FOR LEARNING REDUCTION TECHNIQUES AND A METHOD FOR LEARNING THE REDUCTION TECHNIQUES USING THE ANATOMICAL MODEL FOR TRAINING AID

TECHNICAL FIELD

The present invention relates to an anatomical model for training aid for learning reduction techniques and a method for learning the reduction techniques using the anatomical model for training aid.

BACKGROUND ART

Since the time when there was no X-ray examination or anesthetic techniques, treatment with Judo therapy has been widely practiced as a method of treating bone fractures and dislocations. Judo therapy is a medical practice classified under Eastern medicine, and is of great importance even in modern times as a technique of treating a bone fracture not too severe to require surgical operation or hospitalization, or dislocation. In addition, because treatment with Judo therapy does not involve anesthetizing, the treatment can be painful, but a highly skilled Judo therapist can treat effectively, quickly and carefully to minimize the pain. Judo therapy is also effective in giving first aid for sports and at scenes of an accident and a disaster. Judo therapy is no less excellent a treatment method than orthopedic treatment of Western medicine which is based on medical equipments in medical facilities and treatment under anesthesia.

Becoming a Judo therapist performing aforementioned Judo therapy requires attending a vocational school, etc. for training Judo therapists in order to learn reduction techniques. Reduction techniques greatly involve sensing such as visual and tactile senses and thus a trainee learns the techniques by watching a trainer performing reduction on an actual patient with a fracture or a dislocation in a clinical setting or by actually performing reduction on his own. However, in recent years, since the number of Judo therapy schools increased because of deregulation and the number of the students increased rapidly, there are less opportunities for trainees to actually perform reduction on patients in a clinical setting, and as a result, the number of Judo therapists who have not been able to learn sufficient reduction techniques has been increasing. In addition, when a trainee without reduction techniques performs reduction on a patient in practical training, the reduction can bring uneasiness or pain to the patient.

As described above, these days, Judo therapy schools are struggling to figure out how to train highly skilled Judo therapists, which is an issue not only for Judo therapy schools but is becoming prominent as a significant problem in Judo therapy industry and eventually on the medical front in Japan. Inventors suggest an anatomical model for training aid for learning reduction techniques aimed for reducing a fracture of a distal end of a radius to solve this problem (Patent Document 1). However, in the fields of Eastern medicine where Judo therapy or the like is representative, it is a current situation that there is no method of learning reduction techniques enabling an experience similar to actual treatment of a patient with a fracture or a dislocation and being applicable to various symptoms of fractures and dislocations. Moreover, there has been a demand for an anatomical model for training aids for more purposes and improvement thereof.

PRIOR ART DOCUMENT

Patent Document

Patent Document 1: JP 3144317 U

SUMMARY OF THE INVENTION

Problem to be Solved by the Invention

The present invention has been made in the light of the aforementioned conventional problems, and the object of the present invention is to provide an anatomical model for training aid for learning reduction techniques which allows learning of reduction technique without performing reduction on an actual patient by reproducing symptoms similar to actual fracture and dislocation on the anatomical model for training aid and a method of learning the reduction techniques by using the anatomical model for training aid.

Means to Solve the Problem

A method for learning reduction techniques of the present invention uses an anatomical model for training aid which comprises at least one or more hard bone members having shapes similar to human bones and a soft member covering the bone members, at least one of the bone members comprising a first bone member and a second bone member separated from and adjacent to each other, either one of the first bone member or the second bone member being at least partially provided with a magnet and the other being provided with a magnetic material in at least a part of or in the vicinity of its site contacting the former one, and has at least two connection statuses, i.e. a normal connection status where the first bone member and the second bone member are connected in a status similar to a normal connection status of human bones and an abnormal connection status where they are connected in a status different from the normal connection status of human bones, wherein the method for learning the reduction techniques is characterized by comprising a step of arranging the first bone member and the second bone member of the anatomical model for training aid into the abnormal connection status and a reduction step of applying reduction performance to the bone members in the abnormal connection status to move them into the normal connection status.

A method for learning a reduction technique for shoulder joint dislocation of the present invention uses an anatomical model for training aid which comprises hard bone members comprising at least a humerus member, a scapula member, a clavicle member and a thorax member having arrangement relationship similar to human bones and a soft member covering the bone members, the humerus member and the scapula member being adjacent to each other, a head of the humerus member being provided with a magnet while a glenoid fossa of the scapula member being at least partially formed of a magnetic material or the head of the humerus member being provided with a magnetic material while the glenoid fossa of the scapula member being at least partially provided with a magnet, the scapula member and the clavicle member being fixed coupled, the clavicle member and the thorax member being movably connected to each other, the scapula member and the thorax member being movably connected to each other or fixed coupled, and has at least two connection statuses, i.e. a normal connection status where the humerus member and the scapula member are connected in a status similar to a normal connection relationship of human bones and an abnormal connection status where they are connected in a status similar to shoulder joint dislocation, wherein the method for the reduction technique is characterized by comprising a step of arranging the humerus member and the scapula member into the abnormal connection status, a step of applying descending traction to the humerus member and applying at least one or more reduction performances from elevation, depression movement, abduction movement, adduction movement, inferior rotation and superior rotation to the scapula member so as to move the humerus member from the abnormal connection status into the normal connection status, and a step of fixing the scapula member and applying at least one or more reduction performances from flexion, extension, abduction, adduction, external rotation, internal rotation and traction to the humerus member so as to move the scapula member from the abnormal connection status into the normal connection status.

A method for learning a reduction technique for typical displacement of clavicle fracture of the present invention uses an anatomical model for training aid which comprises hard bone members comprising at least a humerus member, a scapula member, a clavicle member and a thorax member having arrangement relationship similar to human bones and a soft member covering the bone members, the humerus member and the scapula member being movably connected to each other, the scapula member and the clavicle member being fixed coupled, the clavicle member and the thorax member being movably connected to each other, the scapula member and the thorax member being movably connected to each other or fixed coupled, the clavicle member comprising a proximal fragment member and a distal fragment member separated in the middle third (at the junction of middle and outer thirds) of the clavicle member and contacting each other, and a site of the proximal fragment member contacting the distal fragment member being at least partially formed of a magnetic material while a side of the distal fragment member contacting the proximal fragment member being provided with a magnet or a side of the proximal fragment member contacting the distal fragment member being provided with a magnet while a site of the distal fragment member contacting the proximal fragment member being at least partially formed of a magnetic material, and has at least two connection statuses, i.e. a normal connection status where the proximal fragment member and the distal fragment member are connected so as to have the same shape as a normal clavicle and an abnormal connection status where they are connected in a status similar to typical displacement of clavicle fracture, wherein the method for learning the reduction technique is characterized by comprising a step of arranging the proximal fragment member and the distal fragment member of the clavicle member into the abnormal connection status, a step of applying at least one or more reduction performances from flexion, extension, abduction, adduction, external rotation, internal rotation and traction to the humerus member to move it into the normal connection status, a step of applying at least one or more reduction performances from elevation, depression movement, abduction movement, adduction movement, inferior rotation and superior rotation to the scapula member to move it into the normal connection status, a step of applying at least one or more reduction performances from fixation, elevation, rotation, horizontal flexion and extension to the proximal fragment member of the clavicle member to move it into the normal connection status, and a step of applying reduction performance of direct pressure to the both ends of the proximal fragment member and distal fragment member of the clavicle member to move them into the normal connection status.

An anatomical model for training aid for learning a reduction technique for shoulder joint dislocation of the present invention is characterized by comprising hard bone members comprising at least a humerus member, a scapula member, a clavicle member and a thorax member having arrangement relationship similar to human bones, and a soft member covering the bone members, wherein the humerus member and scapula member are adjacent to each other, a head of the humerus member is provided with a magnet while a glenoid fossa of the scapula member is at least partially formed of a magnetic material or the head of humerus member is provided with a magnetic material while the glenoid fossa of the scapula member is at least partially provided with a magnet, the scapula member and the clavicle member are fixed coupled, the clavicle member and the thorax member are movably connected to each other, the scapula member and the thorax member are movably connected to each other or fixed coupled, and there are at least two connection statuses, i.e. a normal connection status where the humerus member and the scapula member are connected in a status similar to normal connection relationship of human bones, and an abnormal connection status where they are connected in a status similar to shoulder joint dislocation.

An anatomical model for training aid for learning a reduction technique for typical displacement of clavicle fracture of the present invention is characterized by comprising hard bone members comprising at least a humerus member, a scapula member, a clavicle member and a thorax member having arrangement relationship similar to human bones, and a soft member covering the bone members, wherein the humerus member and the scapula member are movably connected to each other, the scapula member and the clavicle member are fixed coupled, the clavicle member and the thorax member are movably connected to each other, the scapula member and the thorax member are movably connected to each other or fixed coupled, the clavicle member comprises a proximal fragment member and a distal fragment member separated in the middle third (at the junction of middle and outer thirds) of the clavicle member and adjacent to each other, a site of the proximal fragment member contacting the distal fragment member is at least partially formed of a magnetic material while a side of the distal fragment member contacting the proximal fragment member is provided with a magnet or a side of the proximal fragment member contacting the distal fragment member is provided with a magnet while a site of the distal fragment member contacting the proximal fragment member is at least partially formed of a magnetic material, and there are at least two connection statuses, i.e. a normal connection status where the proximal fragment member and the distal fragment member are connected so as to have the same shape as a normal clavicle, and an abnormal connection status where they are connected in a status similar to typical displacement of clavicle fracture.

An anatomical model for training aid for learning a reduction technique for supracondylar fracture of a humerus of the present invention is characterized by comprising hard bone members comprising at least a humerus member, a forearm bone member, and a carpal, metacarpal and phalange member having arrangement relationship similar to human bones, and a soft member covering the bone members, wherein the humerus member and the forearm bone member are movably connected to each other, the forearm bone member and the carpal, metacarpal and phalange member are movably connected to each other, the humerus member is composed of a proximal fragment member and a distal fragment member separated above and in the vicinity of epicondylus medialis humeri and epicondylus lateralis humeri at the distal end of the humerus and contacting each other, a site of the proximal fragment member contacting the distal fragment member is at least partially formed of a magnetic material while a side of the distal fragment member contacting the proximal fragment member is provided with a magnet or a side of the proximal fragment member contacting the distal fragment member is provided with a magnet while a site of the distal fragment member contacting the proximal fragment member is at least partially formed of a magnetic material, and there are at least two connection statuses, i.e. a normal connection status where the proximal fragment member and the distal fragment member are connected so as to have the same shape as a normal humerus, and an abnormal connection status where they are connected in a status similar to supracondylar fracture of a humerus.

A method for learning a reduction technique for supracondylar fracture of the humerus of the present invention uses an anatomical model for training aid which comprises hard bone members comprising at least a humerus member, a forearm bone member, and a carpal, metacarpal and phalange member having arrangement relationship similar to human bones, and a soft member covering the bone members, the humerus member and forearm bone member being movably connected to each other, the forearm bone member and the carpal, metacarpal and phalange member being movably connected to each other, the humerus member being composed of a proximal fragment member and a distal fragment member separated above and in the vicinity of an epicondylus medialis humeri and an epicondylus lateralis humeri at a distal end of the humerus and contacting each other, a site of the proximal fragment member contacting the distal fragment member being at least partially formed of a magnetic material while a side of the distal fragment member contacting the proximal fragment member being provided with a magnet or a side of the proximal fragment member contacting the distal fragment member being provided with a magnet while a site of the distal fragment member contacting the proximal fragment member being at least partially formed of a magnetic material, and there being at least two connection statuses, i.e. a normal connection status where the proximal fragment member and the distal fragment member are connected so as to have the same shape as a normal humerus, and an abnormal connection status where they are connected in a status similar to supracondylar fracture of a humerus, wherein the method for learning the reduction technique is characterized by comprising a step of arranging the proximal fragment member and the distal fragment member of the humerus member into the abnormal connection status and a step of fixing the proximal fragment member and applying at least one or more reduction performances from traction, medial movement, lateral movement, internal rotation, external rotation, anterior movement and posterior movement to the distal fragment member so as to move them into the normal connection status.

An anatomical model for training aid for learning a reduction technique for anterior temporomandibular joint dislocation of the present invention is characterized by comprising hard bone members comprising at least a connected skull member and a mandibular member having arrangement relationship similar to human bones, and a soft member covering the bone members, wherein the connected skull member and the mandibular member are movably connected to each other, a site of the connected skull member contacting the mandibular member is at least partially formed of a magnetic material while a side of the mandibular member contacting the connected skull member is provided with a magnet or a side of the connected skull member contacting the mandibular member is provided with a magnet while a site of the mandibular member contacting the connected skull member is at least partially formed of a magnetic material, and there are at least two connection statuses, i.e. a normal connection status where the connected skull member and the mandibular member are connected so as to have the same shape as a normal temporomandibular joint and an abnormal connection status where they are connected in a status similar to anterior temporomandibular joint dislocation.

In addition, it is preferred that the anatomical model for training aid further comprises an articular disc member between the connected skull member and the mandibular member, the connected skull member and the articular disc member being movably connected to each other, the mandibular member and the articular disc member being movable independently from each other, a site of the connected skull member contacting the articular disc member being at least partially formed of a magnetic material while a side of the articular disc member contacting the connected skull member being provided with a magnet or a side of the connected skull member contacting the articular disc member being provided with a magnet while a site of the articular disc member contacting the connected skull member being at least partially formed of a magnetic material, and there being at least two connection statuses, i.e. a normal connection status where the connected skull member and the articular disc member are connected so as to have the same shape as a normal temporomandibular joint, and an abnormal connection status where they are connected in a status similar to anterior temporomandibular joint dislocation.

The method for learning the reduction technique for anterior temporomandibular joint dislocation of the present invention uses the anatomical model for training aid which comprises hard bone members comprising at least the connected skull member and the mandibular member having arrangement relationship similar to human bones, and the soft member covering the bone members, the connected skull member and the mandibular member being movably connected to each other, a site of the connected skull member contacting the mandibular member being at least partially formed of a magnetic material while a side of the mandibular member contacting the connected skull member being provided with a magnet or a side of the connected skull member contacting the mandibular member being provided with a magnet while a site of the mandibular member contacting the connected skull member being at least partially formed of a magnetic material, and has at least two connection statuses, i.e. a normal connection status where the connected skull member and the mandibular member are connected so as to have the same shape as a normal temporomandibular joint, and an abnormal connection status where they are connected in a status similar to anterior temporomandibular joint dislocation, wherein the method for learning the reduction technique is characterized by comprising a step of arranging the connected skull member and the mandibular member into the abnormal connection status, and a step of applying at least one or more reduction performances from anterior movement, posterior movement, superior movement, inferior movement, rightward movement and leftward movement to the mandibular member relative to the connected skull member or applying at least one or more reduction performances from rightward movement, leftward movement, superior movement, inferior movement, right lateral flexion and left lateral flexion to a facial surface part of the connected skull member relative to the mandibular member so as to move those bone members into the normal connection status.

Effects of the Invention

Because symptoms similar to actual fracture and dislocation can be reproduced on an anatomical model for training aid to apply reduction performances according to the method of learning reduction techniques of the present invention, it is possible to learn reduction techniques without performing reduction on an actual patient and to improve reduction techniques of Judo therapists. In addition, because the anatomical model for training aid for learning reduction technique of the present invention, not like actual treatment of a patient, makes it possible to perform reduction any number of times, the motion that can be experienced only once in an actual patient treatment can be practiced repeatedly any number of times. In addition, uneasiness and pain of a patient caused by the reduction by a poorly skilled Judo therapist or trainee can be diminished or removed.

EMBODIMENT FOR CARRYING OUT THE INVENTION

Figure 1:
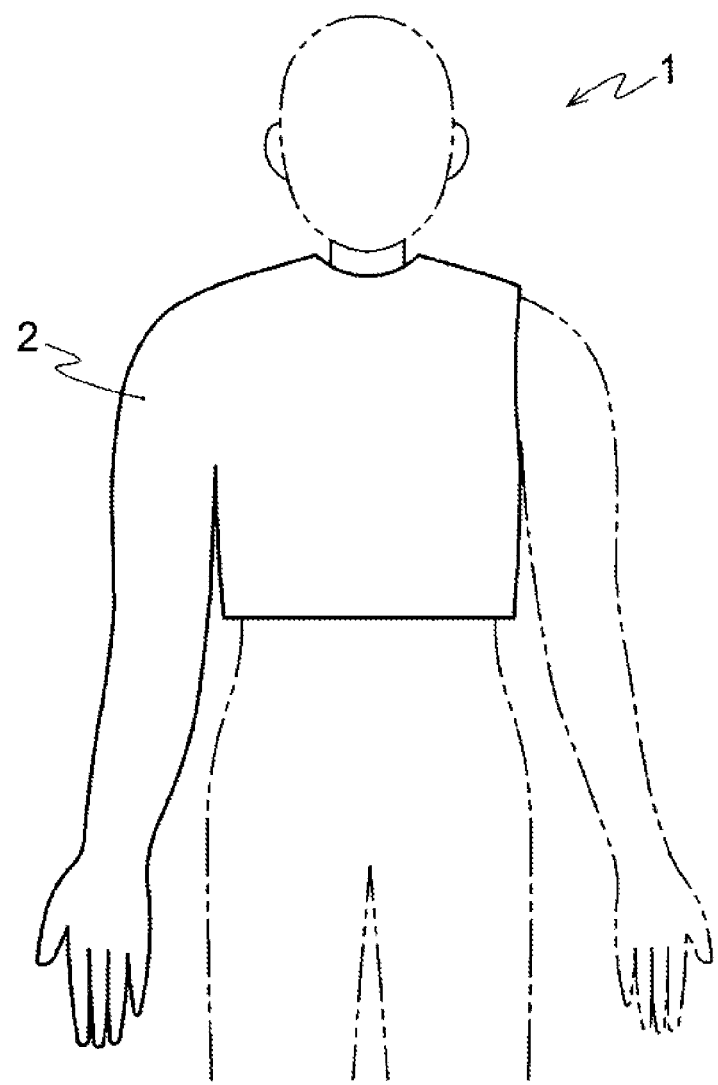
FIG. 1 A schematic front view of an anatomical model for training aid for learning reduction technique for shoulder joint dislocation according to a first embodiment of the present invention.

An anatomical model for training aid for learning reduction techniques according to embodiments of the present invention and a method of learning the reduction techniques using the anatomical model for training aid will be described in details below in accordance with attached drawings.

A first embodiment of the present invention relates to an anatomical model for training aid for learning a reduction technique for shoulder joint dislocation and a method of learning the reduction technique using the same. Before starting to describe the first embodiment, shoulder joint dislocation assumed in this embodiment will be explained briefly. Dislocation refers to a condition where an articular end constituting a joint is completely or incompletely displaced from its normal anatomic status such that physiological relative relation among the articular surfaces is lost. Dislocation falls into the classifications of traumatic dislocation, congenital dislocation and pathologic dislocation, and among them, shoulder joint dislocation in this embodiment is directed to frequently occurring traumatic dislocation. Traumatic dislocation is defined as a condition where one of articular ends comes out of its joint through a tear of a joint capsule torn by the articular end when the joint is forced to move beyond its physiological range by an external force. It is shoulder joint dislocation that occurs most frequently among the traumatic dislocations.

Shoulder joint dislocation is further classified into anterior dislocation (subcoracoid dislocation or subclavian dislocation), posterior dislocation (subacromial dislocation or subspinous dislocation), inferior dislocation (axillary dislocation or subglenoid dislocation) and superior dislocation (epicoracoid dislocation), but subcoracoid dislocation under the category of anterior dislocation is mostly the case, and therefore, subcoracoid dislocation is to be reduced in the first embodiment of the present invention. In this regard, however, shoulder joint dislocation in the present invention is not limited to subcoracoid dislocation.

For easy understanding of the first embodiment, occurrence mechanism, symptoms and typical reduction method of subcoracoid shoulder joint dislocation will be described.

(Occurrence Mechanism)

Subcoracoid shoulder joint dislocation occurs due to (a) a direct external force from behind, (b) an indirect external force exerting excessive extension force on a shoulder joint when a palm is struck from a crash or a fall, (c) an indirect external force by a greater tuberosity serving as a pivot point of a lever when striking a superior edge of a glenoid fossa or an acrominon due to excessive abduction of shoulder joint, or (d) an indirect external force from one's own muscle strength such as during throwing an object.

(Symptoms)

The symptoms are a shoulder joint abducted about 30°, resulting in a humerus shaft presenting slightly abducted and internally rotated position, in addition, a deltoid region losing its prominence, an acrominon forming a horn-shaped protrusion, loss of deltopectoral triangle, furthermore, a hollow region created beneath acrominon, a bone head tactilely sensible beneath a coracoid process (abnormal alignment of the bone head), and furthermore, the humerus in a slightly abducted position, when attached to a chest wall and then released, returning to the original position immediately (elastic fixation).

(Reduction Method)

A method of reduction by Kocher's method will be briefly described. First, (1) a humerus in a lightly abducted position is brought close to a lateral chest wall while applying distal traction (adduction) in a longitudinal direction of the humerus. Secondly, (2) the humerus (shoulder joint) is externally rotated while maintaining the distal traction. Moreover, (3) while bringing an elbow close to a median plane in a manner to slide it over an anterior chest wall (adduction) without easing the traction but with the externally rotated position maintained, flexion (anterior elevation) is applied. Finally, (4) internal rotation is applied such that a palm of an affected side passes in front of and past a face and reaches a side of tendon. Subcoracoid shoulder joint dislocation is treated by this reduction method.

Figure 2:
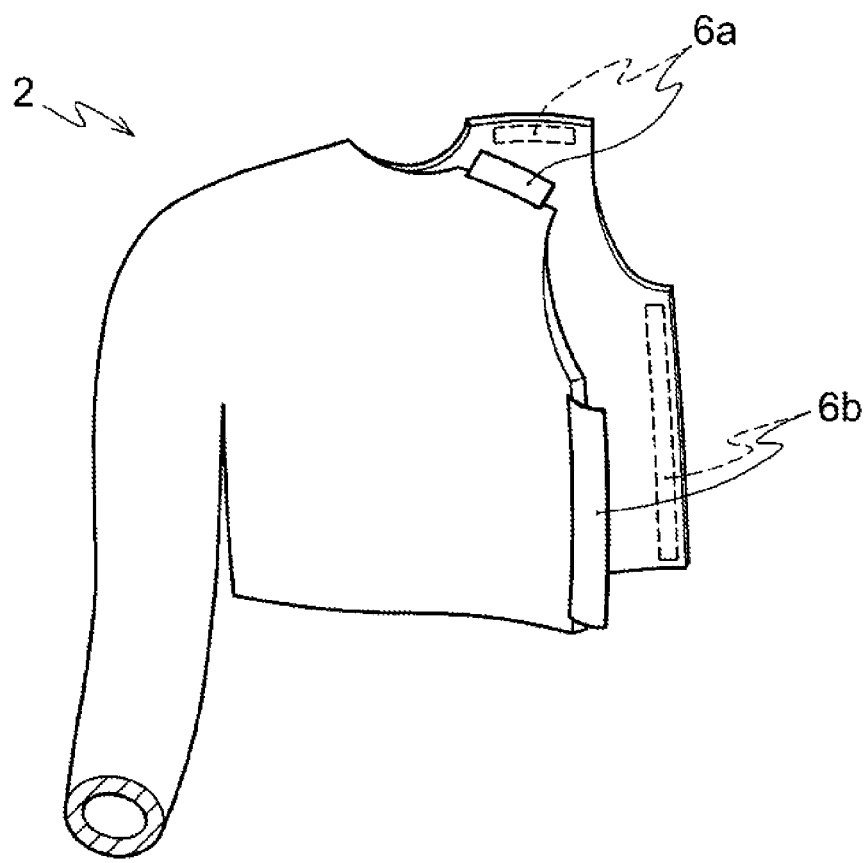
FIG. 2 A schematic front view of a soft member of the anatomical model for training aid of FIG. 1.
Figure 3:
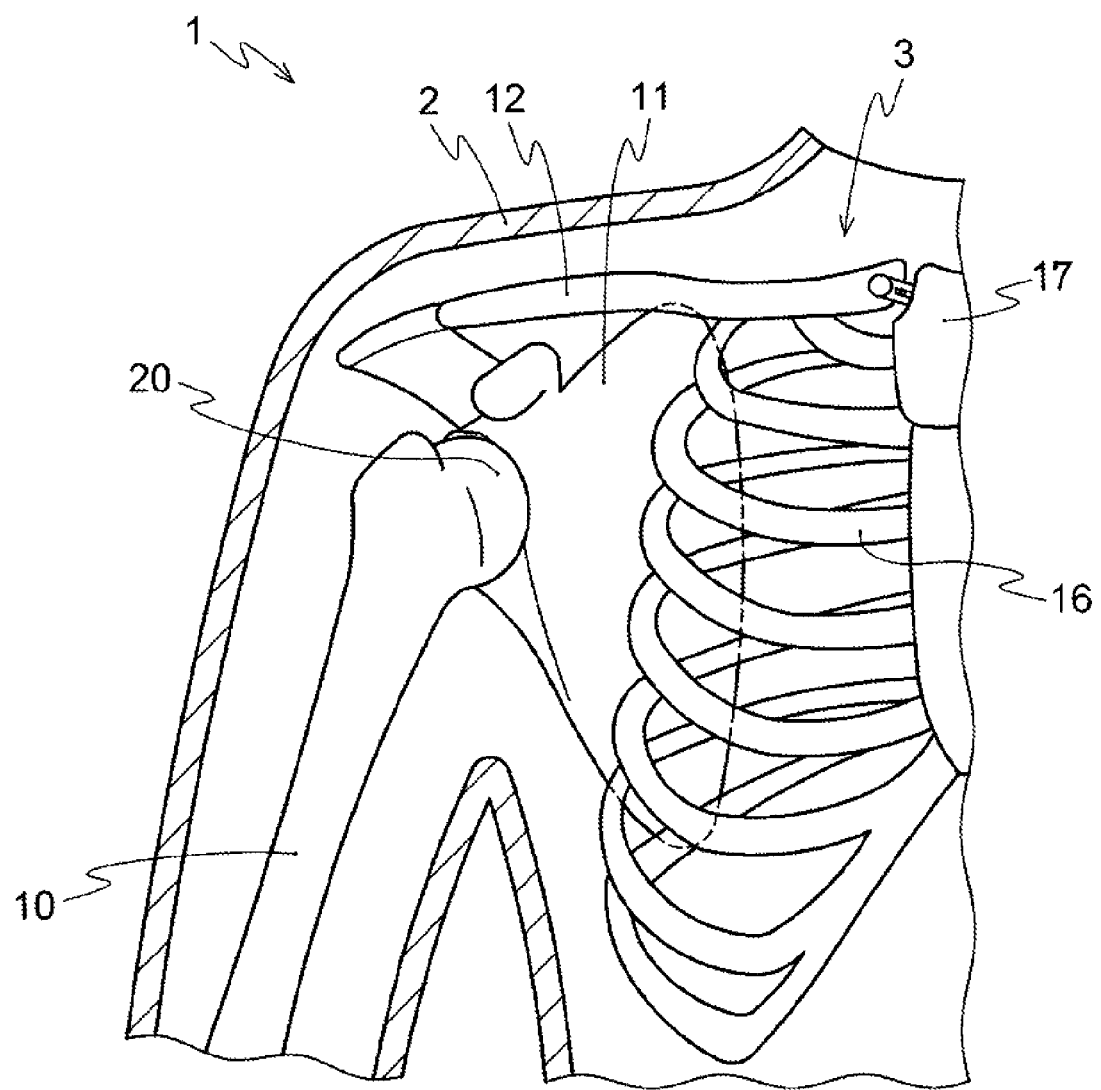
FIG. 3 A schematic cross-sectional view showing the inside of the anatomical model for training aid of FIG. 1 from the front, being a view showing a status of bone members arranged in an abnormal connection status.
Figure 4:
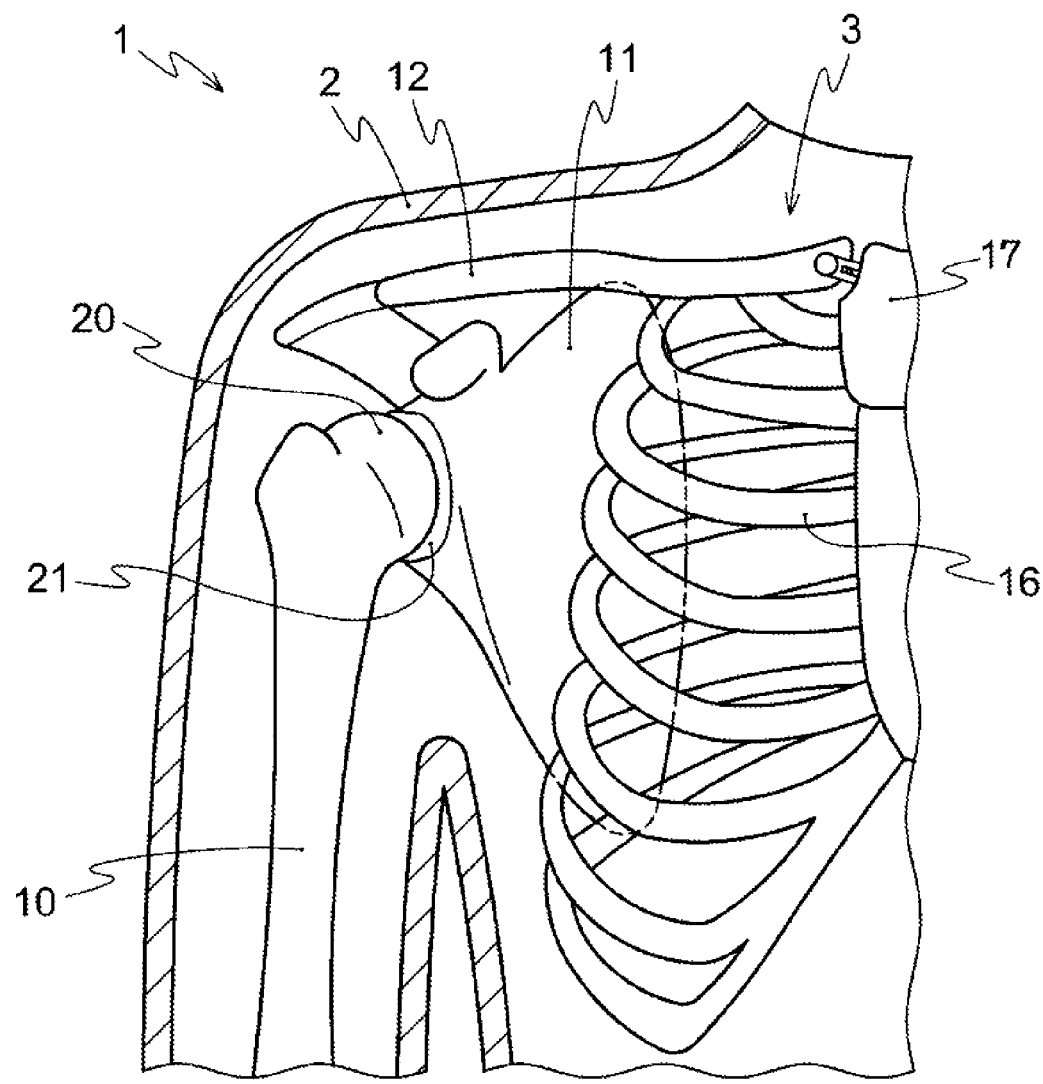
FIG. 4 A view corresponding to FIG. 3, showing a status of the bone members arranged in a normal connection status.

FIG. 1 is a schematic front view of an anatomical model for training aid for learning the reduction technique for shoulder joint dislocation according to the first embodiment of the present invention, FIG. 2 is a schematic front view of a soft member of the anatomical model for training aid of FIG. 1, FIG. 3 is a schematic cross-sectional view showing from the front the inside of the anatomical model for training aid of FIG. 1, showing the status of bone members arranged in an abnormal connection status, and FIG. 4 is a view corresponding to FIG. 3, showing the status of the bone members arranged in a normal connection status.

As shown in those drawings, the anatomical model for training aid 1 for learning the reduction technique for shoulder joint dislocation according to the first embodiment of the present invention (hereinafter referred to as anatomical model for training aid 1) is a whole-body anatomical model, and comprises a soft member 2 covering upper half of the body and bone members 3 constituting a skeleton of the anatomical model for training aid 1. In this regard, the anatomical model for training aid 1 only has to be provided with at least a humerus member 10, a scapula member 11, a clavicle member 12 and a thorax member necessary for reduction of shoulder joint dislocation, and not limited to a whole-body anatomical model.

The soft member 2 reproduces soft tissue of a human body, and it is a hollow member covering the bone members 3 as shown in FIG. 3. In this regard, soft tissue is a concept including skin, subcutaneous fat, muscles and other tissues of a human body except for bones. The soft member 2 is not especially limited as long as it has a texture similar to the one of skin or muscles of a human body, and it is preferably made of rubber material which is soft when touched and the feel of which is similar to the one of soft tissue of a human body.

In addition, it is preferred that the soft member 2 is made of transparent rubber material. While opaque rubber material has an advantage of making it possible to learn a reduction technique in a status closer to actual reduction because the status of the internal bone members 3 can not be visually perceived, transparent rubber material has an advantage of making it possible to check the movement of the internal bone members 3 and understand the relation between reduction performance and movement of bones.

As shown in FIG. 2, the soft member 2 has a region corresponding to a torso of a human body and a region corresponding to an arm of the side where shoulder joint dislocation is reproduced (right arm part in FIG. 2), and a site corresponding to a cervical region and a site corresponding to a base of the arm of the side opposite to the one reproducing shoulder joint dislocation (base of left arm in FIG. 2) are provided with openings for inserting bone members 3 constituting the internal structure of the anatomical model for training aid 1. In addition, the soft member 2 is configured to be separated on the side opposite to the one reproducing shoulder joint dislocation into an anterior aspect (ventral side) and a posterior aspect (back side) such that it can be opened. In particular, a region from shoulder section to a flank section of the soft member 2 is separated into the anterior aspect and the posterior aspect, which makes it possible to mount the soft member 2 on the bone members 3 as if putting on clothes by putting the bone members 3 of the anatomical model for training aid 1 of the side reproducing shoulder joint dislocation from the open site of the soft member 2.

The soft member 2 is mounted in a manner that the anterior aspect and the posterior aspect are attached removably by attachment parts 6a, 6b adhered to the separated shoulder section and the flank section so as to maintain the status where it covers the bone member 3. The attachment parts 6a, 6b are not especially limited as long as they can attach removably, and velco (trademark) strips or zippers can be used. Using velco strips, above all, is preferable in that it makes it possible to mount the soft member 2 on the bone members 3 easily and quickly, and does not impair flexibility of the soft member 2.

As shown in FIGS. 3 and 4, the bone members 3 comprises at least the humerus member 10, the scapula member 11, the clavicle member 12 and the thorax member. The thorax member comprises at least a spine member (not illustrated because it is located in the posterior aspect of a sternum member 17), a rib member 16 and the sternum member 17. It is preferred that each of those bone members 3 has a shape and arrangement relationship similar to the ones of human bones such that actual reduction techniques can be learned. In other words, the humerus member 10 and the scapula member 11 are connected in a manner that a head 20 of the humerus member 10 and a glenoid fossa 21 of the scapula member 11 are movably connected at a site corresponding to a shoulder joint (scapulohumeral joint) of a human body. In addition, the scapula member 11 and the clavicle member 12 are connected at a site corresponding to an acromioclavicular joint of a human body, the sternum member 17 and the clavicle member 12 are connected at a site corresponding to a sternoclavicular joint of a human body, and the scapula member 11 and the rib member 16 are connected at a site corresponding to a scapulothoracic joint of a human body.

In addition, the bone members 3 configured in this way have the same movability range as the range of motion of a human body. This allows the same movement as a human body to be reproduced on the anatomical model for training aid 1, enabling the creation of a status even closer to actual reduction performance. Respective bone members 3 are, except as especially described below, movably coupled to one another at sites corresponding to joints of a human body by wires, springs or rubbers, etc., and because of biasing force of an elastic body such as springs and rubbers, etc., the same movements as the ones of a human body and a sense of resistance to such movements are reproduced.

Material of the bone members 3 is not especially limited as long as it can reproduce the texture of human bones, and it is preferred that, except as especially described below, they are made of metal such as stainless, iron, copper and aluminum because they are easy to process into shapes of human bones, and it is preferred that they are made of synthetic resin such as PVC (polyvinyl chloride), FRP or wood because they are light in weight.

Figure 5:
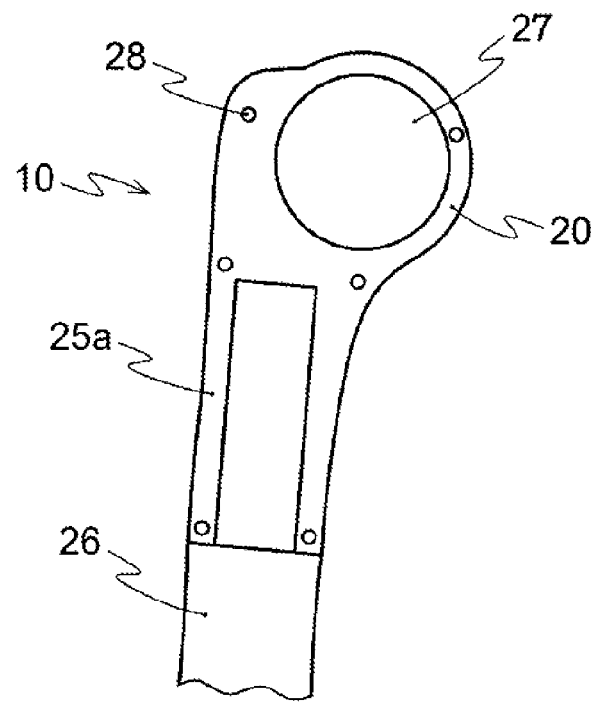
FIG. 5 A schematic explanatory view of a status of an exposed inside of a head of a humerus member of FIG. 3, as seen from the front.
Figure 6:
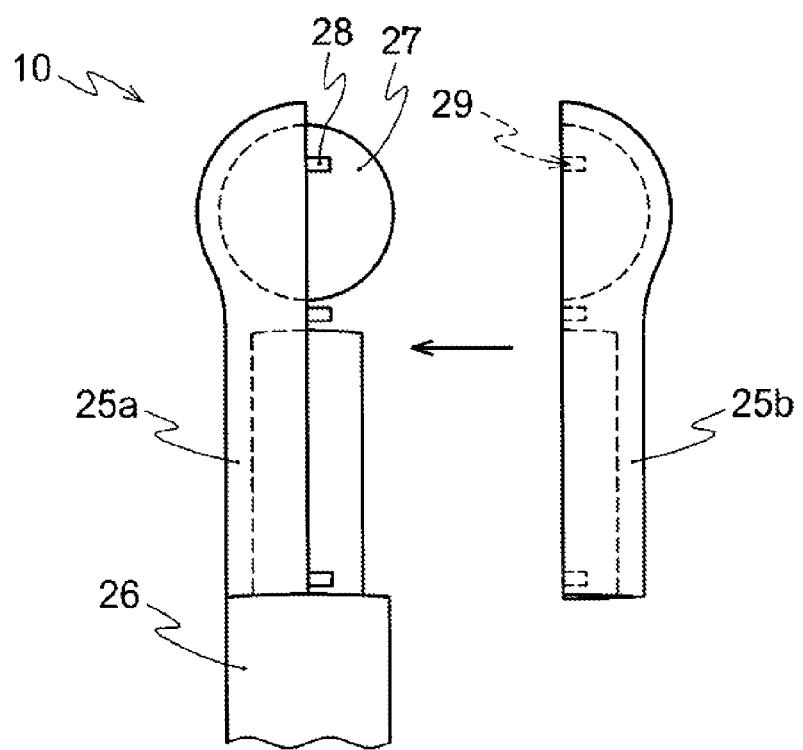
FIG. 6 A schematic explanatory view of the humerus member of FIG. 5, as seen from the side.

FIG. 5 is a schematic explanatory view of a status of the exposed inside of the head of the humerus member of FIG. 3, as seen from the front. FIG. 6 is a schematic explanatory view of the humerus member of FIG. 5, as seen from the side.

As shown in FIGS. 5 and 6, the humerus member 10 is composed of proximal humerus members 25a, 25b bisected parallel to a longitudinal direction and fixed with one placed on the other, and a humerus shaft member 26 fixed with its one end sandwiched between the proximal humerus members 25a, 25b. Hemispherical concave portions are formed individually inside the heads 20 of the proximal humerus members 25a, 25b, and a spherical space is formed inside the head 20 of the humerus member 10 by putting the proximal humerus members 25a, 25b together. The proximal humerus members 25a, 25b have a plurality of engagement convex portions 28 formed on one of their facing surfaces, and the other surface has a plurality of engagement concave portions 29 formed at the positions corresponding to the engagement convex portions 28. By putting the proximal humerus members 25a, 25b together and engaging the engagement convex portions 28 into the engagement concave portion 29, both can be fixed detachably. It is preferred that the material of the proximal humerus members 25a, 25b is stainless or iron, and it is preferred that the material of the humerus shaft member 26 is synthetic resin such as PVC. In this regard, the diameter of the head 20 formed into a sphere is not especially limited, but it is preferably 35-55 mm, more preferably 40-50 mm, and most preferably 43-47 mm A ball-shaped magnet 27 to reproduce static attachment for a normal position or a dislocated position, or a sense of resistance of muscle during reduction is arranged inside this spherical space formed inside the head 20 of the humerus member 10. The size of this magnet 27 varies depending on the size of the head 20 of the humerus member 10, but it is preferably 10-40 mm in diameter, more preferably 15-38 mm, and most preferably 20-36 mm. In addition, the kind of this magnet 2 can be ferrite magnet or permanent magnet such as neodymium magnet, but it is preferred to use neodymium magnet among all. The magnetic force of the magnet 27 is not especially limited, but in the light of reproducing the sense of resistance at the same level as the one of muscle or tendon in a human body, it is preferably 5800-7700 gauss, more preferably 6000-7500 gauss, and most preferably 7500-7500 gauss.

Figure 7:
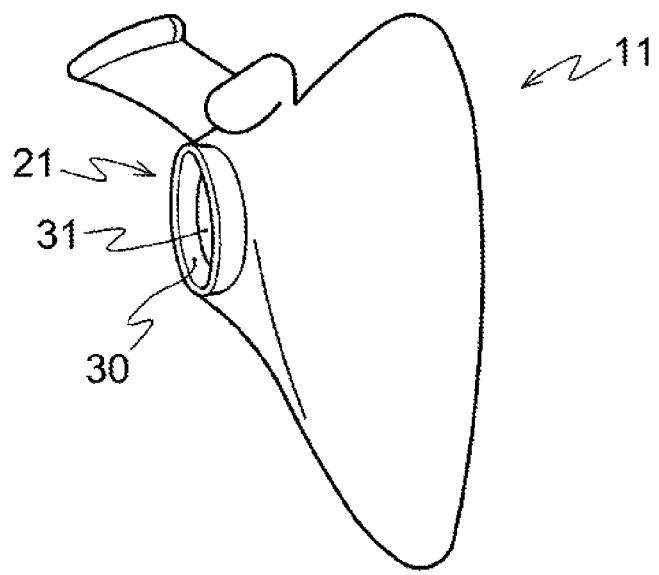
FIG. 7 A schematic view of a scapula member of FIG. 3, as seen diagonally from the front.
Figure 8:
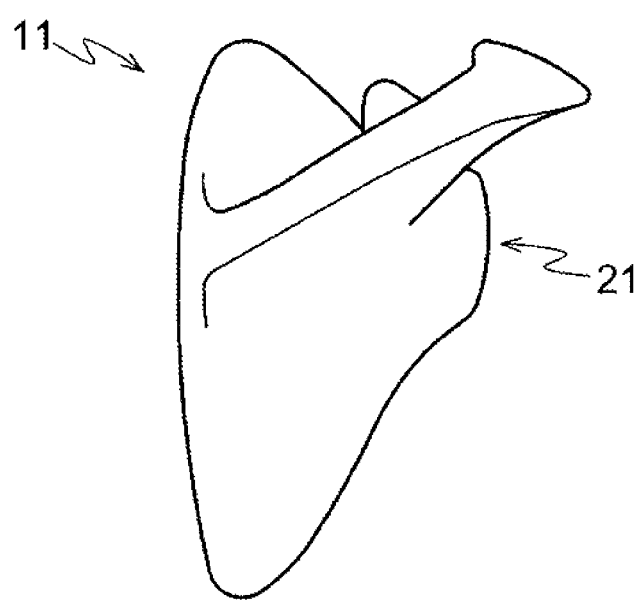
FIG. 8 A schematic view of the scapula member of FIG. 7, as seen from the back.

FIG. 7 is a schematic view of the scapula member of FIG. 3 as seen diagonally from the front, and FIG. 8 is a schematic view of the scapula member of FIG. 7 as seen from the back.

As shown in FIGS. 7 and 8, the scapula member 11 has a circular articular labrum member 30, corresponding to an articular labrum of a human body, fixed to the glenoid fossa 21 serving as a coupling site with the humerus member 10, and has a magnetic material 31 fixed on the articular labrum member 30. At least the glenoid fossa 21 and its vicinity should be formed of a magnetic material such that the scapula member 11 is attracted to the magnet 27 of the humerus member 10, the glenoid fossa 21 has a magnetic material 31 having a form of a substantially circular plate fixed thereto by a screw or adhesive, and a magnetic material in the form of a plate (not illustrated) is fixed substantially all over the anterior aspect and posterior aspect of the scapula member 11 with a screw or adhesive in a manner to follow the shape of the scapula member 11. In this embodiment, the anterior aspect of the scapula member 11, although not especially illustrated, is formed of a magnetic material at a site adjacent to the head 20 of the humerus member 10 in an abnormal connection status described below and a site adjacent to the rib member 16. In addition, the posterior aspect of the scapula member 11 is formed of a magnetic material below a site corresponding to a scapular spine of a human body, which is a site adjacent to the head 20 of the humerus member 10 in the abnormal connection status described below. Examples of the magnetic material include iron and martensitic stainless steel.

The articular labrum member 30 has a circular shape encompassing the entire glenoid fossa 21, and has a shape similar to an articular labrum and an articular capsule of a human body. In addition, the articular labrum member 30 is formed of material without magnetism. Accordingly, the articular labrum member 30 is not attracted to the magnet 27 of the humerus member 10, allowing the head 20 of the humerus member 10 to slide on the articular labrum member 30 during reduction such that a movement similar to actual reduction can be reproduced. Material of the articular labrum member 30 is not especially limited as long as it does not have magnetism, and rubber, synthetic resin or metals such as aluminum can be used. A screw, adhesive and the like can be used to fix the articular labrum member 30 to the scapula member 11.

The humerus member 10 and the scapula member 11 formed in this way are connected in a manner that the head 20 of the humerus member 10 and the glenoid fossa 21 of the scapula member 11 are movably connected to each other at a site corresponding to a shoulder joint (scapulohumeral joint) of a human body, and therefore, they can have a normal connection status and an abnormal connection status and reproduce a status similar to shoulder joint dislocation. Here, in the present invention, the normal connection status refers to a status where respective bone members 3 are coupled to one another in a status similar to a normal shoulder joint of a human body, and in this embodiment, it refers to a status where the head 20 of the humerus member 10 and the glenoid fossa 21 of the scapula member 11 are coupled to each other. In the present invention, the abnormal connection status refers to a status where the respective bone members 3 are coupled in a status different from the aforementioned normal connection status, in other words, to a status where they are coupled in a status similar to dislocations or fractures in a human body, and in this embodiment, it is a status where they are coupled in a status similar to shoulder joint dislocation of a human body, in other words, a status where the head 20 of the humerus member 10 is shifted anteriorly, posteriorly or inferiorly to the glenoid fossa 21 of the scapula member 11 to be connected off the glenoid fossa 21 of the scapula member 11.

The connection site between the scapula member 11 and the clavicle member 12 is a site corresponding to an acromioclavicular joint of a human body. Because this acromioclavicular joint is a strongly coupling and immovable joint because of ligaments, not allowing movability, the scapula member 11 and the clavicle member 12 are fixed coupled by a metal fixture, rubber, adhesive or the like.

Figure 9:
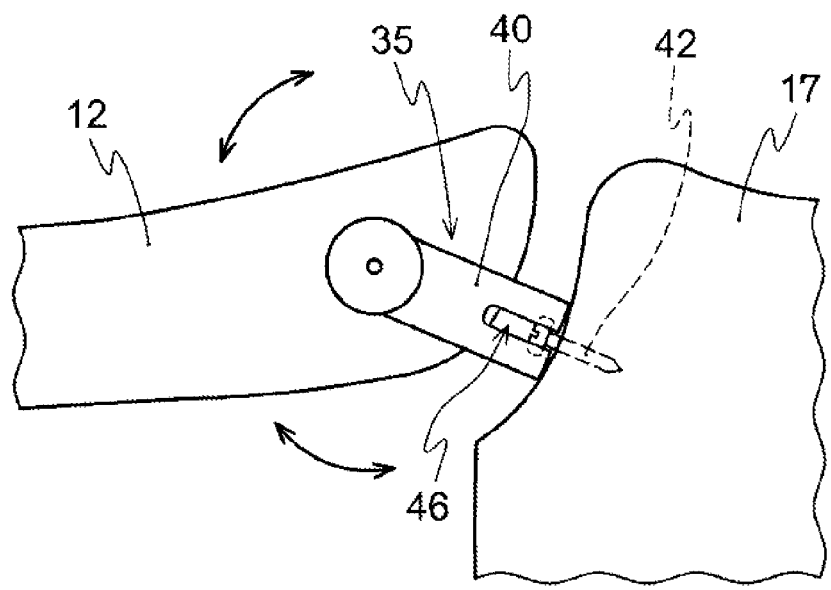
FIG. 9 An enlarged explanatory view of a connection site between a clavicle member and a sternum member of FIG. 3, as seen from the front.
Figure 10:
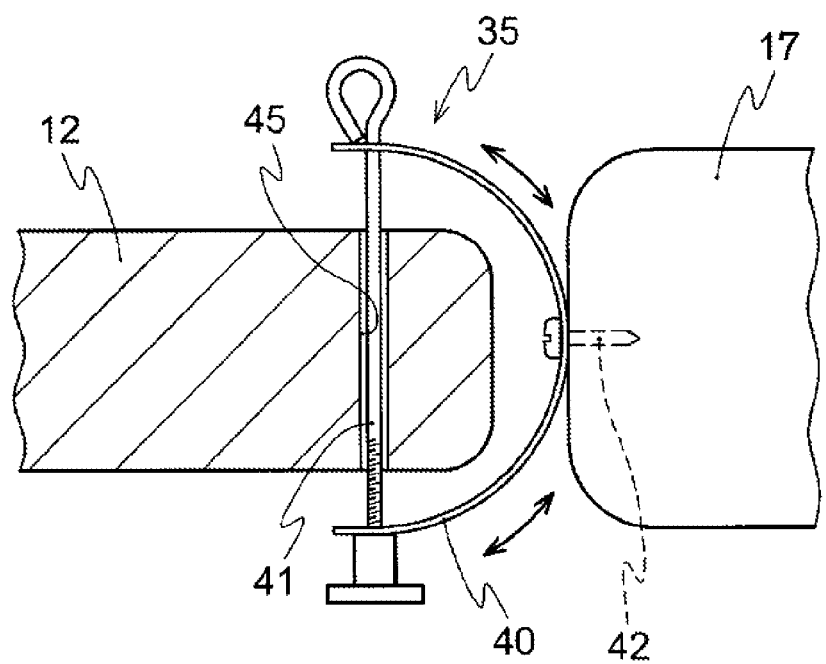
FIG. 10 A schematic explanatory view of the connection site of the clavicle member and the sternum member of FIG. 9, as seen from above.

FIG. 9 is an enlarged explanatory view of the connection site between the clavicle member and the sternum member of FIG. 3 as seen from the front, and FIG. 10 is a schematic explanatory view of the connection site between the clavicle member and the sternum member of FIG. 9 as seen from above.

As shown in FIGS. 9 and 10, the connection site between the clavicle member 12 and the sternum member 17 of the thorax member is a site corresponding to a sternoclavicular joint of a human body. The clavicle member 12 and the sternum member 17 are movably connected to each other by a metal rotatable fixture 35.

The rotatable fixture 35 is a member made of metal, comprising a semicircular portion 40 of an elongated plate-like body curved into a semicircular shape, a rod-shaped axial portion 41 fixed to both ends of the semicircular portion 40 and inserted through an aperture formed on a proximal end of the clavicle member 12, and a pin 42 movably fixed to the semicircular portion 40 and fixed to an end of the sternum member 17. The semicircular portion 40 has, in its center, an elongate hole 46 formed parallel to its longitudinal direction. The pin 42 fixed to the sternum member 17 is fixed to this elongate hole 46 such that the pin 42 is movable along the longitudinal direction of the elongate hole 46. In addition, the clavicle member 12 is fixed to the rotatable fixture 35 in a manner to be freely pivotable about the axial portion 41. Accordingly, elevation, rotation, horizontal flexion and extension performances can be applied to the clavicle member 12 relative to the sternum member 17. By the way, the clavicle member 12 and the sternum member 17 can be movably connected to each other by rubber instead of this rotatable fixture 35.

Figure 11:
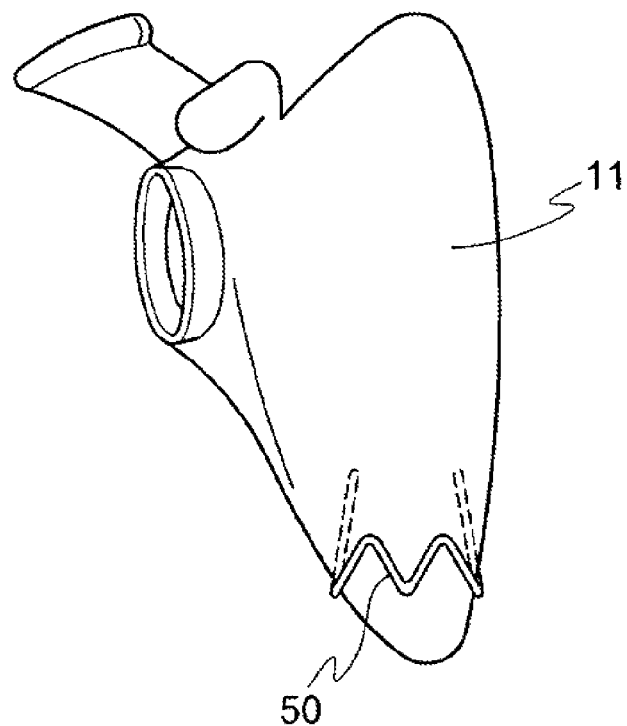
FIG. 11 A schematic explanatory view for explaining a connection status between the scapula member and a rib member of FIG. 3, being a view of the scapula member as seen diagonally from the front.
Figure 12:
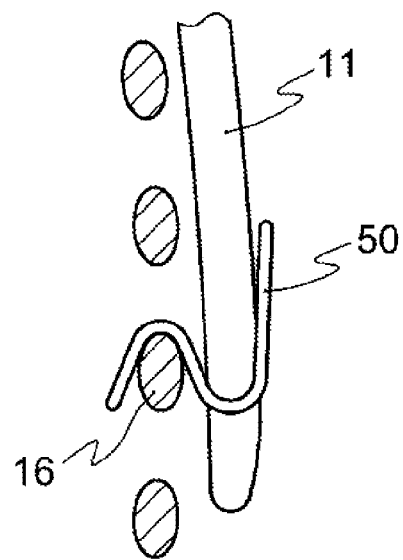
FIG. 12 A schematic lateral cross-sectional view for explaining the connection status between the scapula member and the rib member of FIG. 3.

FIG. 11 is a schematic explanatory view for explaining the connection status between the scapula member and the rib member of FIG. 3, being a view of the scapula member as seen diagonally from the front, and FIG. 12 is a schematic explanatory view for explaining the connection status between the scapula member and the rib member of FIG. 3, being a lateral cross-sectional view.

As shown in FIGS. 11 and 12, the connection site between the scapula member 11 and the rib member 16 of the thorax member is a site corresponding to a scapulothoracic joint of a human body. The scapula member 11 and the rib member 16 are fixed coupled by an engagement member 50.

The engagement member 50 is an N-shaped member having a first curved portion curved downward from above and a second curved portion curved upward from beneath. With the first curved portion of the engagement member 50 engaging the rib member 16 and the second curved portion engaging the scapula member 11, the scapula member 11 and the rib member 16 can be detachably fixed. In this regard, in this embodiment, the engagement member 50 is formed by bending a wire made of metal, but not limited thereto, and it can be synthetic resin formed into the aforementioned shape. Accordingly, performances of elevation, depression movement, abduction movement, adduction movement, inferior rotation (rotation in a direction of a spine) and superior rotation (rotation in a direction of an axilla) can be applied to the scapula member 11 relative to the rib member 16.

Next, the method for learning the reduction technique for shoulder joint dislocation using the anatomical model for training aid 1 according to this embodiment will be described.

First, the bone members 3 of the anatomical model for training aid 1 are arranged into the abnormal connection status, that is, a status similar to shoulder joint dislocation of a human body. In this embodiment, as shown in FIG. 3, the head 20 of the humerus member 10 is positioned not to the glenoid fossa 21 of the scapula member 11, but anteriorly to the glenoid fossa 21. At this point, the head 20 of the humerus member 10 attracts the anterior aspect of the scapula member 11 formed of a magnetic material by attraction force of the magnet 27 inside the head, reproducing a status similar to shoulder joint dislocation of a human body.

Secondly, for the humerus member 10 in the abnormal connection status, descending traction is applied to the humerus member 10, and at least one or more reduction performances from elevation, depression movement, abduction movement, adduction movement, inferior rotation and superior rotation are applied to the scapula member 11 so as to move the bone members 3 into the normal connection status. Moreover, for the scapula member 11 in the abnormal connection status, the scapula member 11 is fixed and at least one or more reduction performances from flexion, extension, abduction, adduction, external rotation, internal rotation and traction are applied to the humerus member 10 so as to move the bone members 3 into the normal connection status, that is, a status where the head 20 of the humerus member 10 and the glenoid fossa 21 of the scapula member 11 are connected. At this point, on the anterior aspect of the scapula member 11 during moving the head 20 of the humerus member 10, attraction force of the magnet 27 attracting the magnet material of the scapula member 11 allows the reproduction of a sense of resistance similar to the one during actual reduction. Then, approaching the articular labrum member 30, the head 20 slides on the articular labrum member 30 because the articular labrum member 30 is made of material with no magnetism, and after moving past it, the magnet 27 of the head 20 attracts the glenoid fossa 21 formed of a magnetic material so that the head 20 of the humerus member 10 and the glenoid fossa 21 of the scapula member 11 are stabilized in the normal connection status as shown in FIG. 4.

As described above, according to the method for learning the reduction technique for shoulder joint dislocation of the present invention, an uneven pathway with concavity and convexity to reduce a dislocated head of a humerus into a glenoid fossa of a scapula and outwardly extending structure of the glenoid fossa of the scapula and an articular labrum in actual reduction of shoulder joint dislocation can be reproduced on the anatomical model for training aid. This makes it possible to experience the movement similar to actual reduction performances where only traction force does not allow the head of the humerus to be reduced into the glenoid fossa of the scapula but allows it to reach a lateral edge of the glenoid fossa of the scapula, and rotation force and leverage force are added to reduce it in a manner to move it beyond the lateral edge of the glenoid fossa of the scapula. In addition, if the soft member is a transparent member, it is possible to visually observe actual movement of the head of the humerus such as during Kocher reduction method, and to understand at what timing rotation should be exerted after traction and which part serves as a pivot point of a lever when applying leverage force. Therefore, Judo therapist can be expected to improve their skills more than ever by practicing repeatedly. Furthermore, by using the above anatomical model for training aid or by providing Judo therapy schools with a method for teaching the reduction technique adopting the method for learning the reduction technique using the anatomical model for training aid, not only the improvement of skills of Judo therapists but also contribution to the improvement in Judo therapy education can be expected.

An anatomical model for training aid 1 according to a second embodiment and a method for learning a reduction technique using the anatomical model for training aid 1 are basically same as the ones according to the first embodiment explained above, and thus they will be described with a focus on their differences. The second embodiment is different from the first embodiment in that the anatomical model for training aid 1 according to the second embodiment does not have a ball-shaped magnet 27 provided inside a head 20 of a humerus member 10 formed of a magnetic material such as iron and stainless as shown in FIG. 5, a magnetic material 31 provided in a glenoid fossa 21 of a scapula member 11 shown in FIGS. 7 and 8 is a magnet, and a magnetic material in the form of a plate provided substantially all over the anterior aspect and the posterior aspect of the scapula member 11 in a manner to follow the shape of the scapula member 11 is a magnet.

In this embodiment, although not especially illustrated, the anterior aspect of the scapula member 11 has magnets fixed to a site adjacent to the head 20 of the humerus member 10 in an abnormal connection status described below and a site adjacent to a rib member 16. In addition, the posterior aspect of the scapula member 11 has a magnet below a site corresponding to a scapular spine of a human body, i.e. a site adjacent to the head 20 of the humerus member 10 in the abnormal connection status described below. By configuring this way as well, a status similar to shoulder joint dislocation of a human body is reproduced on the anatomical model for training aid 1, and thus the same function and effect as the ones according to the first embodiment can be exerted. In this regard, if material of the humerus member 10 is a non-magnetic material such as synthetic resin, it may be configured to have a ball-shaped magnetic material inside the head 20 of the humerus member 10 as shown in FIG. 5.

Figure 13:
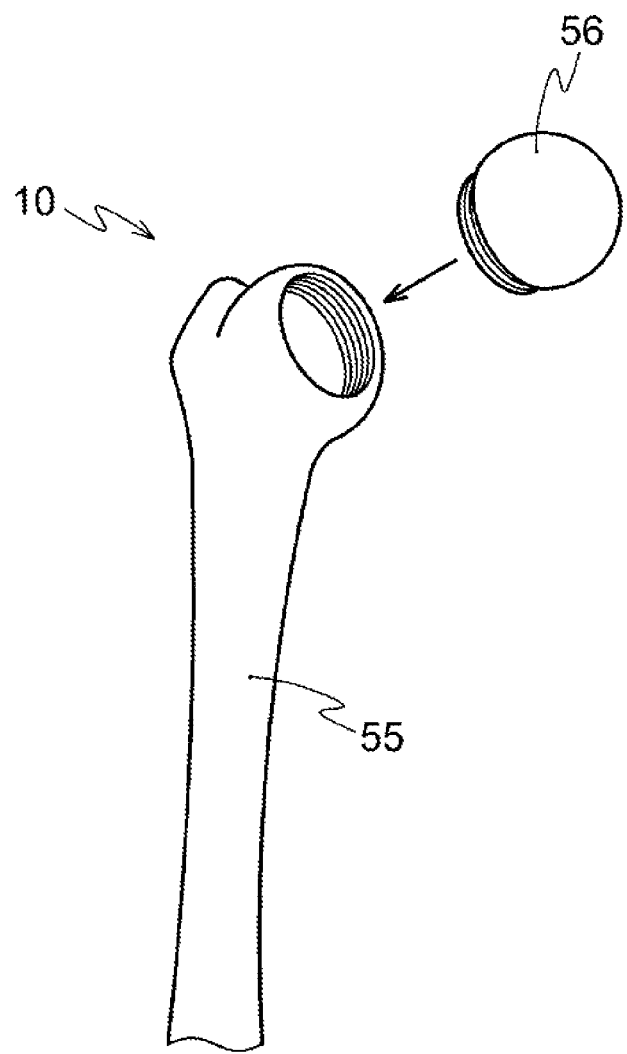
FIG. 13 A schematic perspective view of a humerus member of an anatomical model for training aid for learning a reduction technique for shoulder joint dislocation according to a third embodiment of the present invention.

FIG. 13 is a schematic perspective view of a humerus member of an anatomical model for training aid for learning a reduction technique for shoulder joint dislocation according to a third embodiment of the present invention. The anatomical model for training aid 1 according to the third embodiment and a method for learning the reduction technique using the anatomical model for training aid 1 are basically same as the ones according to the first embodiment explained above, and thus they will be described with a focus on their differences.

The third embodiment is different from the first embodiment in that the humerus member 10 according to the third embodiment comprises a main body of humerus member 55 not having a head 20 but having an internal thread at the base part of the head 20, and a substantially spherical bone head member 56 having an opening and an external thread formed at the periphery of the opening to be screwed into the internal thread. A ball-shaped magnet (not illustrated) can be inserted through the opening of the bone head member 56 to the inside, and by screwing the main body of humerus member 55 and the bone head member 56 together after the insertion, the same function and effect as the ones of the humerus member 10 according to the first embodiment can be exerted.

A fourth embodiment of the present invention relates to an anatomical model for training aid for learning a reduction technique for typical displacement of clavicle fracture and a method for learning the reduction technique for typical displacement of clavicle fracture using the same. Before starting to describe the fourth embodiment, occurrence mechanism, symptoms and typical reduction method of typical displacement of clavicle fracture assumed in this embodiment will be explained briefly. Concerning the occurrence mechanism, typical displacement of clavicle fracture is often caused by falling and being struck on the shoulder hard. The symptoms of typical displacement of clavicle fracture occur in the middle third (at a junction of middle and outer thirds) of a clavicle (a position made by longitudinally dividing the clavicle into three), where a proximal fragment is posterosuperiorly displaced and a distal fragment is displaced and shortened anteroinferiorly.

Typical reduction methods include a method of reduction in the supine position and a method of reduction in the seating position. One example of the method of reduction in the supine position will be described. An operating table for clavicle reduction is adjusted to the height of a bed and set up such that the upper back part of a patient will come off the bed from its end and be properly on the operating table for clavicle reduction when the patient is placed supine on the bed. The patient bends down such that his upper body reaches this position, and he is placed supine on the operating table for reduction. With both shoulders abducted, the upper limb and the distal fragment on an affected side are sufficiently pulled in a posterior lateral superior direction such that the distal fragment is placed on a longitudinal axis of a proximal fragment of a clavicle. Leaving the arm in this posture for a while almost reduces the displacement. If the reduction is insufficient, a practitioner fixes the proximal fragment with the fingers of his one hand, and while his assistant pulls the shoulder in a posterior lateral superior direction so as to bring the ends of a fracture close to each other, the practitioner grasps the fractured end of the distal bone with the other hand and exerts direct pressure on both ends of the fracture so as to complete the reduction.

In the method of reduction in the seating position, first, a patient is placed in the seated position, and a first assistant is positioned posteriorly to the patient with his kneecaps attached to the spine part and pulls on patient's both shoulders posterolateraly with his hands under the both arms of the patient to remove shortening. Meanwhile, a second assistant figures out the condition of an upper arm and a forearm of an affected limb, lifts the upper arm and a scapula superolaterally and brings a inferiorly displaced distal fragment close to a proximal fragment. A practitioner figures out the condition of both ends of a fracture with both of his hands in the same manner as the reduction method in the supine position, and performs reduction by applying pressure to both bone fragments so as to align the distal fragment with the proximal fragment.

Figure 14:
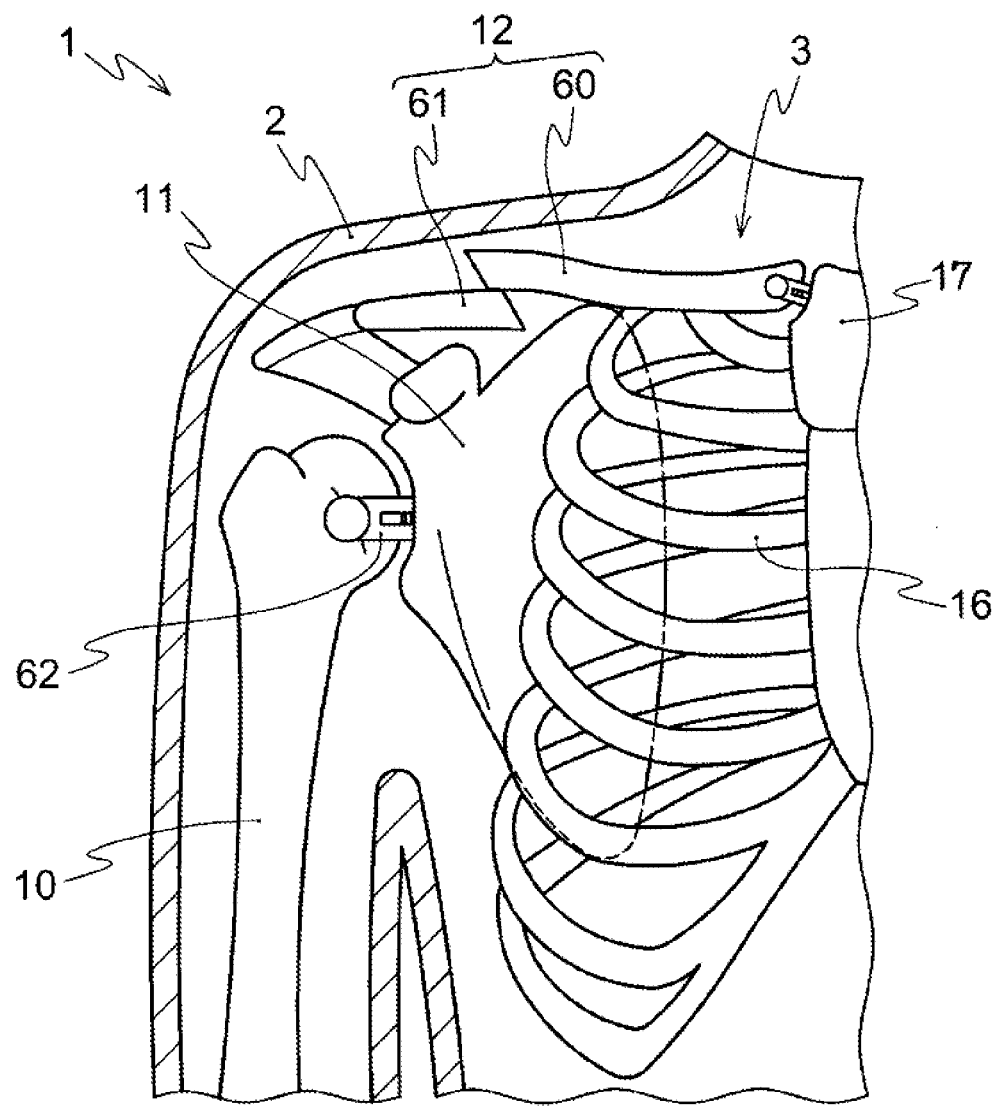
FIG. 14 A schematic cross-sectional view showing from the front the inside of an anatomical model for training aid for learning a reduction technique for typical displacement of clavicle fracture according to a fourth embodiment of the present invention, showing a status of bone members arranged in an abnormal connection status.
Figure 15:
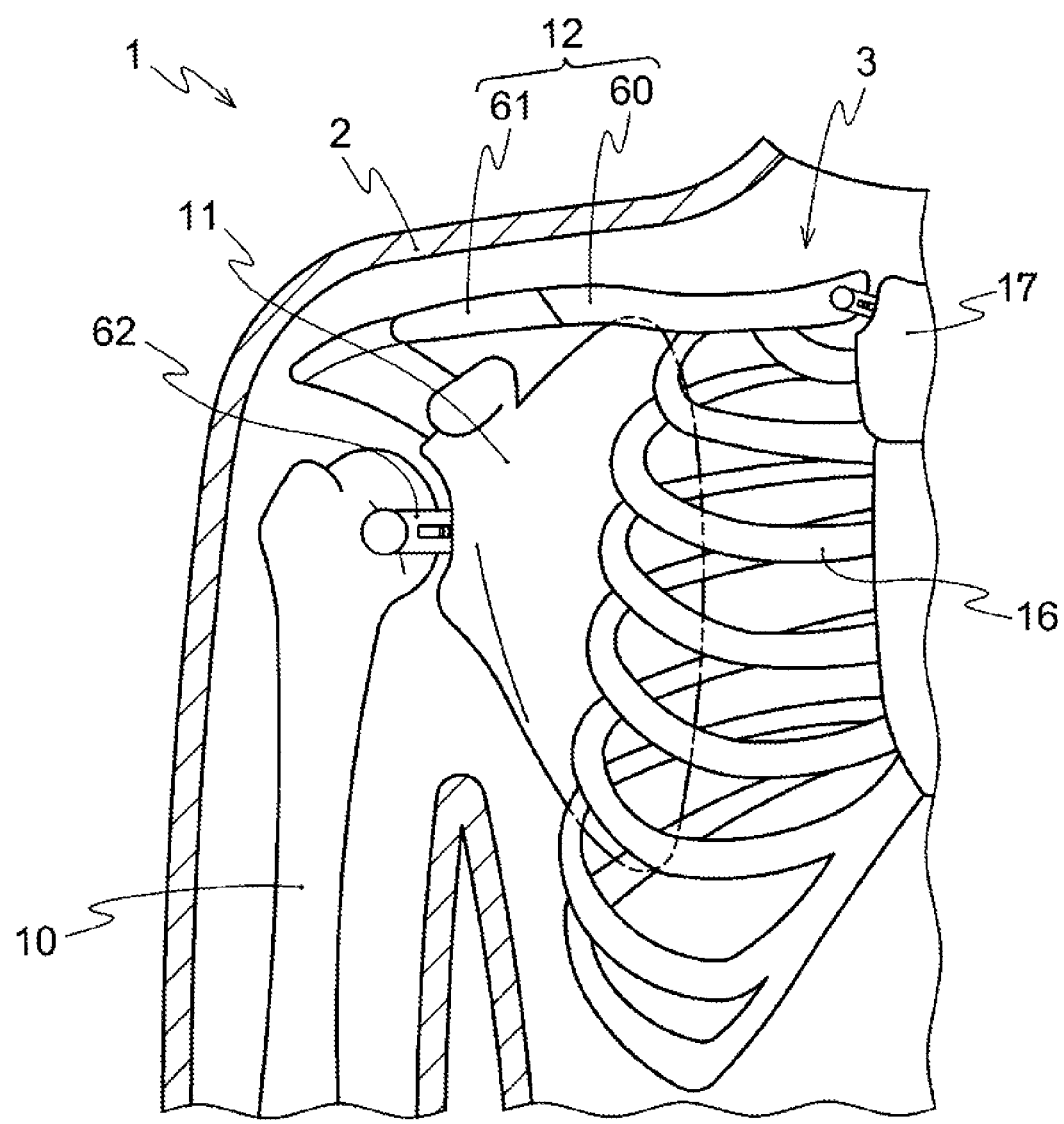
FIG. 15 A view corresponding to FIG. 14, showing a status of the bone members arranged in a normal connection status.
Figure 16:
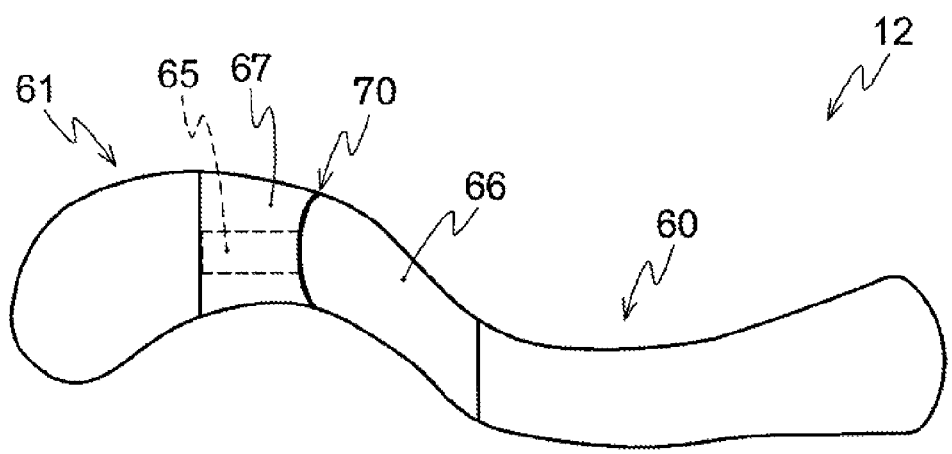
FIG. 16 A schematic top view of a clavicle member of FIG. 14.
Figure 17:
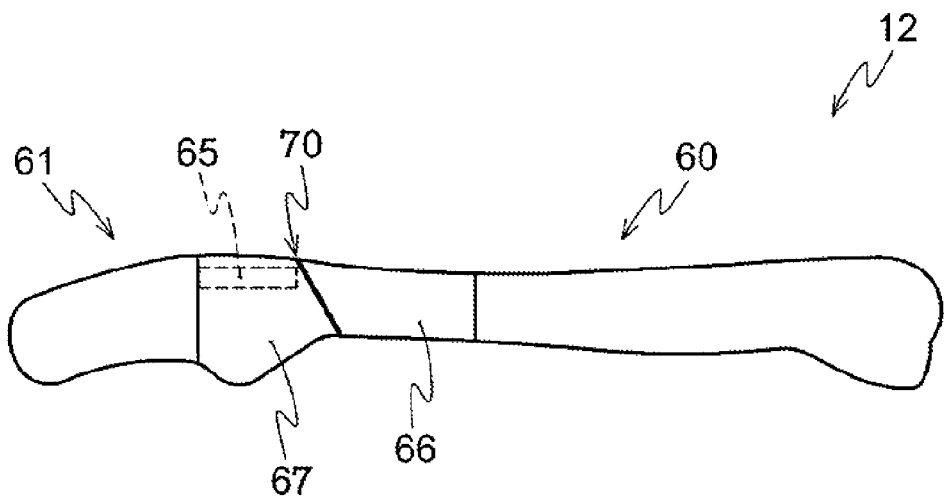
FIG. 17 A schematic front view of the clavicle member FIG. 16.
Figure 18:
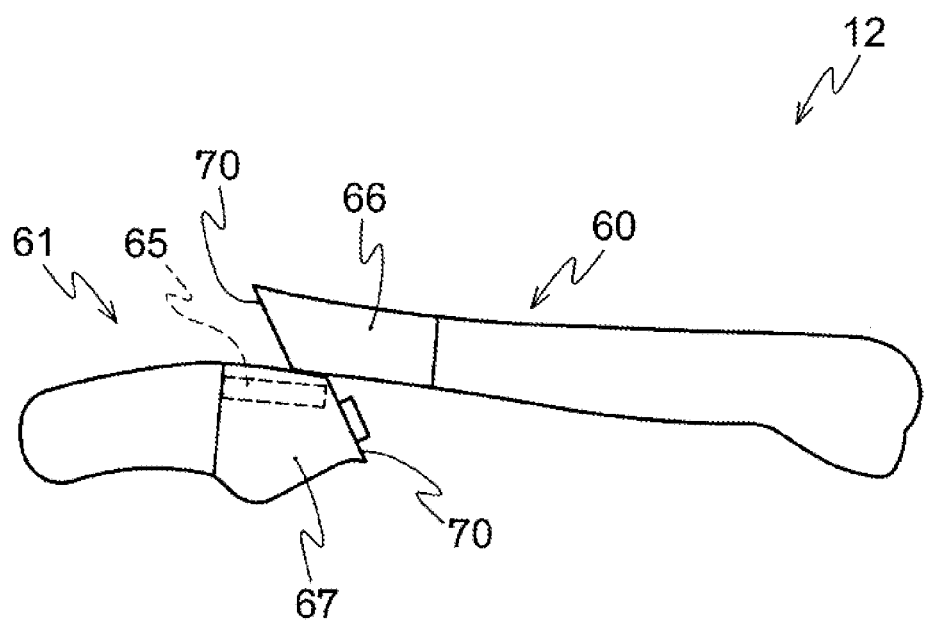
FIG. 18 A view corresponding to FIG. 17, showing an abnormal connection status of a proximal fragment member and a distal fragment member of the clavicle member.
Figure 19:
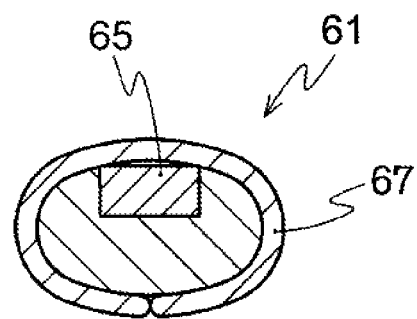
FIG. 19 A schematic lateral cross-sectional view of the distal fragment member of FIG. 16.
Figure 20:
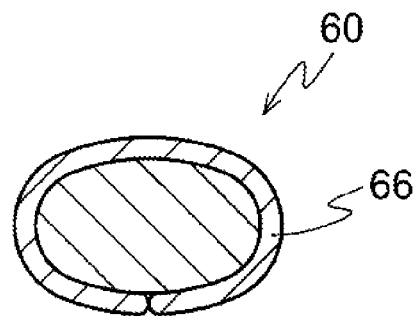
FIG. 20 A schematic lateral cross-sectional view of the proximal fragment member of FIG. 16
Figure 21:
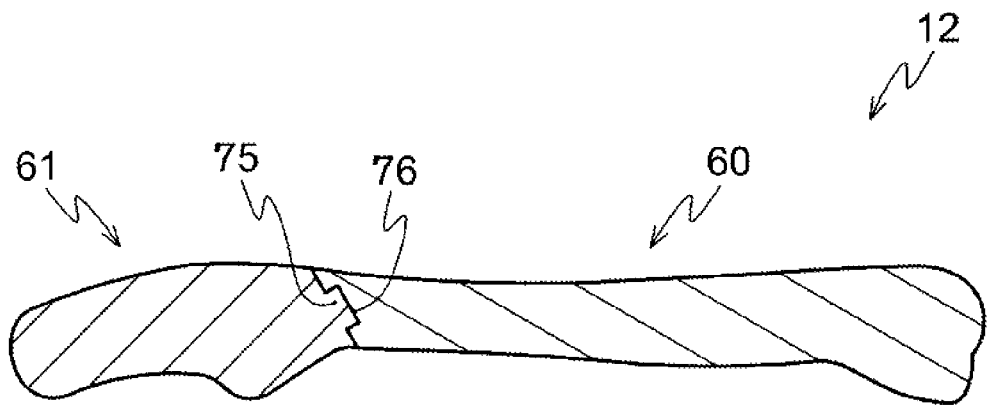
FIG. 21 A longitudinal cross-sectional view of the clavicle member of FIG. 16.

FIG. 14 is a schematic cross-sectional view showing from the front the inside of an anatomical model for training aid for learning a reduction technique for typical displacement of clavicle fracture according to a fourth embodiment of the present invention, showing a status of bone members arranged in an abnormal connection status, FIG. 15 is a view corresponding to FIG. 14, showing a status where the bone members are arranged in a normal connection status, FIG. 16 is a schematic top view of a clavicle member of FIG. 14, FIG. 17 is a schematic front view of the clavicle member of FIG. 16, FIG. 18 is a view corresponding to FIG. 17, showing a proximal fragment member and a distal fragment member of the clavicle member in an abnormal connection status, FIG. 19 is a schematic lateral cross-sectional view of the distal fragment member of FIG. 16, FIG. 20 is a schematic lateral cross-sectional view of the proximal fragment member of FIG. 16, and FIG. 21 is a longitudinal sectional view of the clavicle member of FIG. 16. The anatomical model for training aid 1 for learning the reduction technique for typical displacement of clavicle fracture according to the fourth embodiment and a method for learning the reduction technique using the anatomical model for training aid 1 are basically same as the ones according to the first embodiment explained above, and thus they will be described with a focus on their differences.

As shown in FIGS. 14 and 15, the anatomical model for training aid 1 for learning the reduction technique for typical displacement of clavicle fracture according to the fourth embodiment (hereinafter referred to as anatomical model for training aid 1) is different from the one according to the first embodiment in that the clavicle member 12 is composed of the proximal fragment member 60 and the distal fragment member 61 separated in the middle third of the clavicle member, and a humerus member 10 and a scapula member 11 are connected by a rotation fixture 62.

As shown in FIGS. 16, 17 and 18, the clavicle member 12 is composed of the proximal fragment member 60 and the distal fragment member 61 separated at a separation surface 70 of the middle third of the clavicle member. It is preferred that the proximal fragment member 60 and the distal fragment member 61 are entirely made of magnetic materials such iron and stainless, but they can be made of synthetic resin as well.

A concave portion, not illustrated, is formed above the vicinity of the end of distal fragment member 61 on its separation surface 70 side, and a magnet 65 is contained in this concave portion. This concave portion can be formed by cutting away the upper part of the distal fragment member 61 or cutting away the separation surface.

In addition, as shown in FIGS. 19 and 20, on the sides of the separation surface 70 of both the proximal fragment member 60 and the distal fragment member 61, plate-like bodies 66, 67 made of magnetic materials such as iron and stainless are respectively fixed in a manner to wrap around those members, following their outlines. This allows attraction force of the magnet 65 to keep the proximal fragment member 60 and distal fragment member 61 from being apart, even if the proximal fragment member 60 is displaced posterosuperiorly and the distal fragment member 61 is displaced anteroinferiorly and is shortened, and makes it possible to reproduce typical displacement of clavicle fracture where a clavicle is separated in the middle third of clavicle member.

It is preferred that a square neodymium magnet is used as the magnet 65. The magnet force of the magnet 65 is preferably 1900-5500 gauss, more preferably 2500-4500 gauss, and most preferably 3000-4000 gauss. Examples of the magnet 65 suitable for this embodiment include a one being a 20 mm×10 mm sized square, having 3530 gauss and having attraction force of 4.58 kg. In this regard, it is preferred that the magnet 65 is not exposed on the separation surface 70 and has an interposing plate-like body such as made of iron. This prevents the magnet 65 from being broken when contacting the proximal fragment member 60.

As shown in FIG. 21, the proximal fragment member 60 and the distal fragment member 61 respectively have a convex portion 75 and a concave portion 76 with shapes corresponding to each other, formed on the separation surface 70. This makes it possible to set positions of the proximal fragment member 60 and the distal fragment member 61 to such a degree to allow movability at the position where they are moved from the abnormal connection status into the normal connection status by reduction performance, and therefore it becomes possible to confirm whether appropriate reduction performance has been applied or not. In addition, there is an advantage of being closer to actual reduction because an actual site of a fracture is uneven and has concavity and convexity. In this regard, the convex portion 75 and the concave portion 76 can have shapes with more gradually curved surfaces as long as their positions can be set, or a spring hook allowing easy recognition of position setting can be provided instead.

Moreover, as shown in FIG. 14, the humerus member 10 and the scapula member 11 are movably connected to each other by a rotatable fixture 62. This rotatable fixture 62 is a member made of metal, comprising a semicircular portion made of an elongated plate-like body curved into a semicircular shape, a rod-shaped axial portion fixed to both ends of the semicircular portion and inserted through an aperture formed on the head of the humerus member, and a pin 42 movably fixed to the semicircular portion 40 and fixed to a glenoid fossa 20 of the scapula member 11. The shape and structure of the rotatable fixture 62 are basically same as the aforementioned rotatable fixture 35, and thus they will not be described repeatedly. In this regard, the humerus member 10 and the scapula member 11 can be movably connected to each other by rubber instead of this rotatable fixture 62.

Next, the method for learning the reduction technique for typical displacement of clavicle fracture using the anatomical model for training aid 1 according to this embodiment will be described.

First, bone members 3 of the anatomical model for training aid 1 are arranged in an abnormal connection status, that is, a status similar to typical displacement of clavicle fracture of a human body. In this embodiment, as shown in FIG. 14, the end of the proximal fragment member 60 on its separation surface 70 side is shifted posterosuperiorly to the distal fragment member 61, and the end of the distal fragment member 61 on its separation surface 70 side is shifted in a direction anterior medial inferior to the proximal fragment member 60. At this point, because the upper part of the distal fragment member 61 contains the magnet 65 as shown in FIG. 18, the attraction force of the magnet 65 maintains the status of the proximal fragment member 60 and the distal fragment member 61 with the end of the proximal fragment member 60 on its separation surface 70 side shifted posterosuperiorly to the distal fragment member 61, and with the end of the distal fragment member 61 on its separation surface 70 side shifted in a direction anterior medial inferior to the proximal fragment member 60. Accordingly, a status similar to typical displacement of clavicle fracture of a human body can be reproduced on the anatomical model for training aid 1.

Next, at least one or more reduction performances from flexion, extension, abduction, adduction, external rotation, internal rotation and traction are applied to the humerus member 10 at a connecting site between the scapula member 11 and the humerus member 10 arranged in the abnormal connection status, at least one or more reduction performances from elevation, depression movement, abduction movement, adduction movement, inferior rotation and superior rotation are applied to the scapula member 11 on the scapula member 11 and the thorax member, furthermore, at least one or more reduction performances from fixation, elevation, rotation, horizontal flexion and extension are applied to the proximal fragment member 60 of the clavicle member 12 on the proximal fragment member 60 and the thorax member, and reduction performance of exerting direct pressure is applied to both ends of the proximal fragment member 60 and the distal fragment member 61, such that the proximal fragment member 60 and the distal fragment member 61 are moved into a normal connection status as shown in FIG. 15, that is, a status where they have the same shape as a normal clavicle. When the proximal fragment member 60 and the distal fragment member 61 are put into the normal connection status, the convex portion 75 and the concave portion 76 formed on the separation surface 70 of both members are engaged with each other, thereby setting their positions, so as to make it possible to recognize that proximal fragment member 60 and the distal fragment member 61 are engaged together in the normal connection status.

Figure 22:
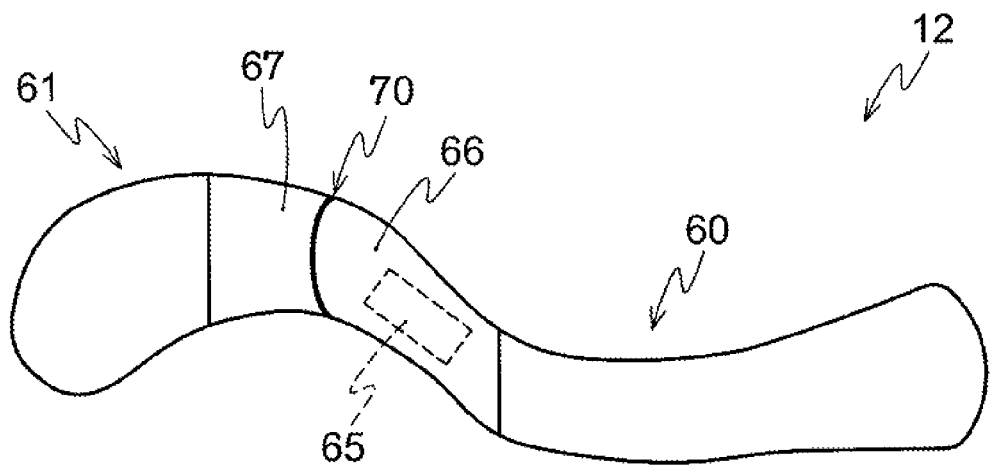
FIG. 22 A schematic top view of a clavicle member of an anatomical model for training aid for learning a reduction technique for typical displacement of clavicle fracture according to a fifth embodiment of the present invention.
Figure 23:
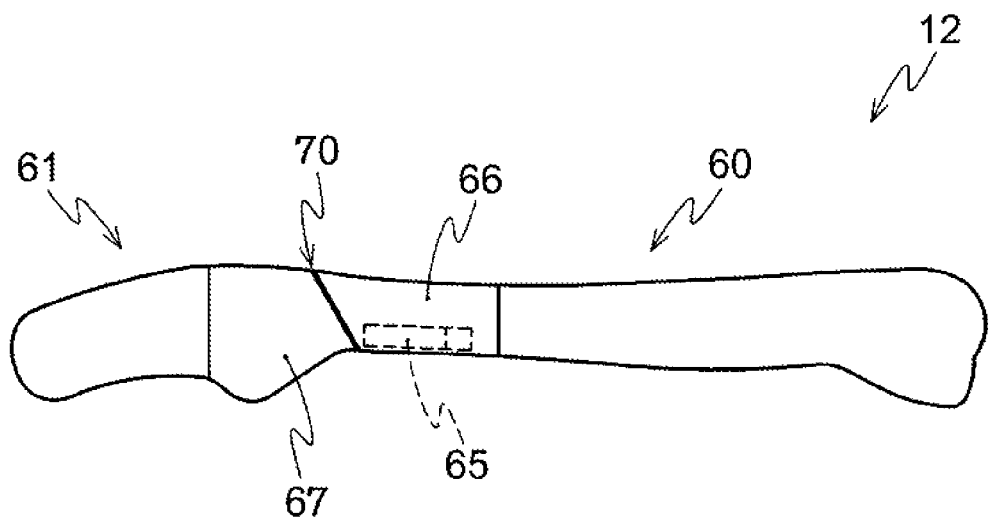
FIG. 23 A schematic front view of the clavicle member of FIG. 22.
Figure 24:
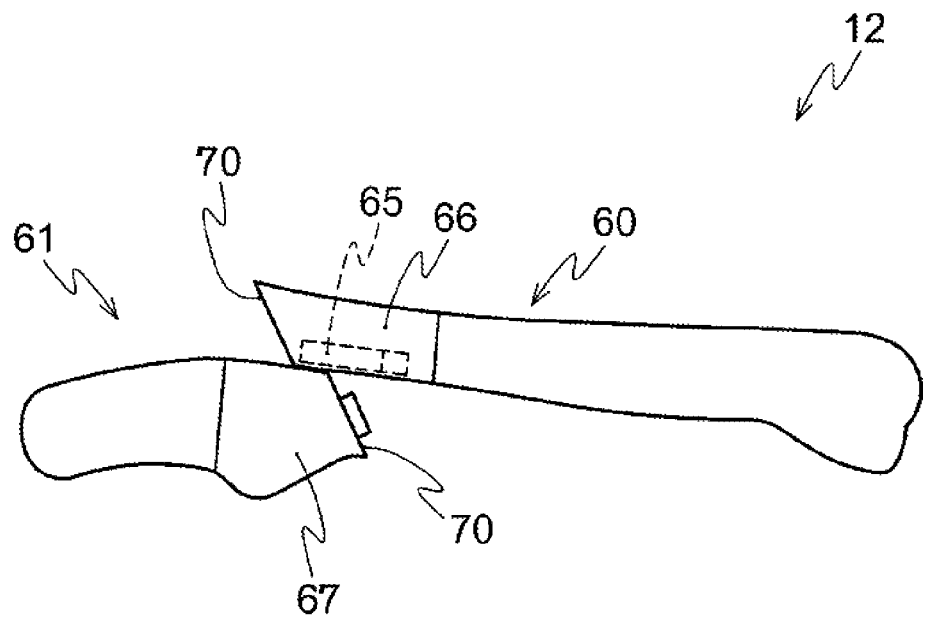
FIG. 24 A view corresponding to FIG. 23, showing an abnormal connection status of a proximal fragment member and a distal fragment member of the clavicle member.

FIG. 22 is a schematic top view of a clavicle member of an anatomical model for training aid for learning a reduction technique for typical displacement of clavicle fracture according to a fifth embodiment of the present invention, FIG. 23 is a schematic front view of the clavicle member of FIG. 22, and FIG. 24 is a view corresponding to FIG. 23, showing a proximal fragment member and a distal fragment member of the clavicle member in an abnormal connection status. The anatomical model for training aid 1 for learning the reduction technique for typical displacement of clavicle fracture according to the fifth embodiment and a method for learning the reduction technique using the anatomical model for training aid 1 are basically same as the ones according to the fourth embodiment explained above, and thus they will be described with a focus on their differences.

As shown in FIGS. 22, 23 and 24, an anatomical model for training aid 1 for learning the reduction technique for typical displacement of clavicle fracture according to the fifth embodiment (hereinafter referred to as anatomical model for training aid 1) is different from the one according to the fourth embodiment in that a magnet 65 is contained below the vicinity of the end of a proximal fragment member 60 on a separation surface 70 side thereof, not of a distal fragment member 61. This allows a status similar to typical displacement of clavicle fracture of a human body to be reproduced on the anatomical model for training aid 1, and the same function and effect as the ones according to the fourth embodiment can be exerted.

Figure 25:
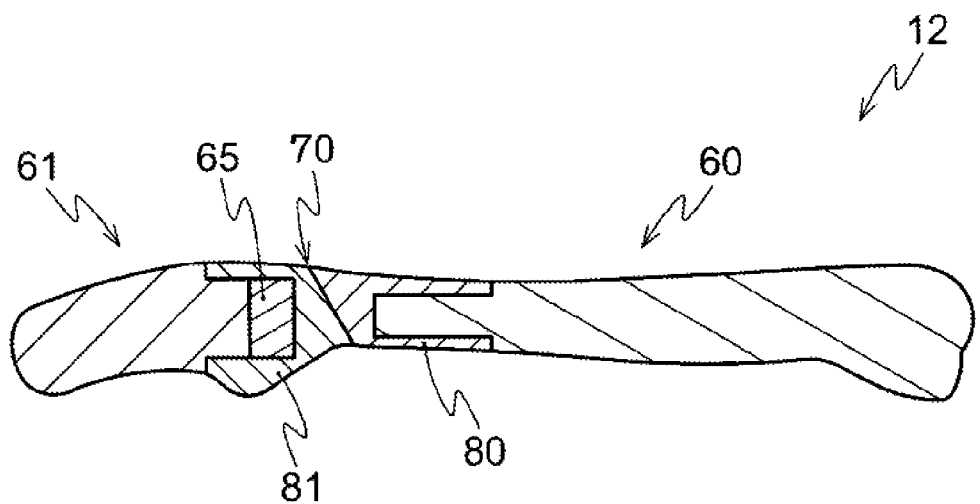
FIG. 25 A schematic longitudinal cross-sectional view of a clavicle member of an anatomical model for training aid for learning a reduction technique for typical displacement of clavicle fracture according to a sixth embodiment of the present invention.

FIG. 25 is a schematic longitudinal cross-sectional view of a clavicle member of an anatomical model for training aid for learning a reduction technique for typical displacement of clavicle fracture according to a sixth embodiment of the present invention. The anatomical model for training aid 1 for learning the reduction technique for typical displacement of clavicle fracture according to the sixth embodiment and a method for learning the reduction technique using the anatomical model for training aid 1 are basically same as the ones according to the fourth embodiment explained earlier, and thus they will be described with a focus on their differences.

As shown in FIG. 25, the anatomical model for training aid 1 for learning the reduction technique for typical displacement of clavicle fracture according to the sixth embodiment (hereinafter referred to as anatomical model for training aid 1) is different from the fourth embodiment in that caps 80, 81 made of a magnetic material such as iron and stainless for covering the respective ends of a proximal fragment member 60 and a distal fragment member 61 on their separation surface 70 sides are mounted on this anatomical model for training aid 1. The proximal fragment member 60 and the distal fragment member 61 are cut away at their respective ends on the side of their separation surface 70 such that the caps 80, 81 can be attached thereto, and the caps 80, 81 are fixed with their concave portions fitted onto the respective ends of the proximal fragment member 60 and the distal fragment member 61 on their separation surface 70 sides. They can be fixed by adhesive and the like. In addition, the concave portion of the cap 81 has a magnet 65 embedded therein beforehand, and magnet 65 is arranged on the distal fragment member 61 on its separation surface 70 side by attaching the cap 81 onto the distal fragment member 61. Accordingly, the magnet 65 provided on the end of distal fragment member 61 on its separation surface 70 side does not directly contact the end of the proximal fragment member 60 on its separation surface 70 side, providing the advantage that the magnet 65 is breakproof. In this regard, the magnet 65 can be configured by being embedded in the concave portion of the cap 80, instead of the cap 81.

As described above, according to the method for learning the reduction technique for typical displacement of clavicle fracture of the present invention, it is possible to experience the movement similar to actual reduction performance for typical displacement of clavicle fracture. In addition, when the soft member is a transparent member, actual movement of bone members during reduction, etc. can be observed visually. Furthermore, Judo therapist can be expected to improve their skills more than ever because it is possible to practice repeatedly. Furthermore, by using the above anatomical model for training aid or by providing Judo therapy schools with a method of teaching reduction techniques adopting the method for learning the reduction techniques using the anatomical model for training aid, not only the improvement of skills of Judo therapists but also contribution to the improvement in Judo therapy education can be expected.

A seventh embodiment of the present invention relates to an anatomical model for training aid for learning a reduction technique for supracondylar fracture of humerus and a method for learning the reduction technique for supracondylar fracture of humerus using the same. Before starting to describe the seventh embodiment, occurrence mechanism, symptoms and reduction method of supracondylar fracture of humerus will be explained briefly.

Supracondylar fracture of humerus is a fracture which occurs above and within 2 cm proximal to epicondylus medialis humeri and epicondylus lateralis humeri at the distal end of a humerus. Because a humerus supracondylar portion is a location where the humerus being proximally circular in cross-section transitions to a triangular shape in a distal direction and it is a mechanically weak section, it is prone to fracture. It can be classified into an extension type and a flexion type depending on occurrence mechanism, and the extension type fracture is mostly the case.

(Occurrence Mechanism and Symptoms)

The extension type fracture occurs due to a strong anterior-projecting flexion force exerted on an elbow part when falling on a hand with an elbow joint in an extended position. Its bone fragment displacement is a displacement of a distal fragment moved in either of posterior, medial, lateral, internally rotating, externally rotating or shortening direction relative to a proximal fragment. The flexion type fracture occurs due to posterior-projecting flexion force exerted on a distal end of a humerus when falling on a cubital region with the elbow joint in a flexed position. Its bone fragment displacement is a displacement of the distal fragment moved in either of anterior, medial, lateral, internally rotating, externally rotating or shortening direction relative to the proximal fragment.

(Reduction Method)

In the case of the extension type fracture, first, a patient is placed on a bed in the supine position to apply abduction to the patient's shoulder joint. (1) While having an assistant hold a brachial region, a practitioner grasps patient's lower end of the humerus in one hand and grasps patient's forearm in the other hand, and slowly applies distal traction so as to reduce shortening. (2) While maintaining the traction, the practitioner uses his hand on the lower end of the humerus to reduce sideways displacement (medial or lateral) and rotation displacement (internal rotation or external rotation). (3) While maintaining the traction, the practitioner places his thumb on the olecranon part, and his other four fingers anterior to the proximal fragment. With his thumb pressing the olecranon forward while gripping the proximal fragment with his four fingers, he puts the forearm into a pronated position or a supinated position depending on a direction of the bone fragment displacement and gradually flexes the elbow joint from 90 degrees to 110 degrees so as to reduce the posterior displacement, thereby completing the reduction. In the case of the flexion type fracture, a reduction method is same as the extension type fracture with respect to the position of a patient, abduction of shoulder joint, and assistant fixing the brachial region, except that a practitioner flexes an elbow joint to reduce shortening, sideways displacement (medial or lateral) and rotation displacement (internal rotation or external rotation), and presses a distal fragment backward to reduce anterior displacement, thereby completing the reduction.

Figure 26:
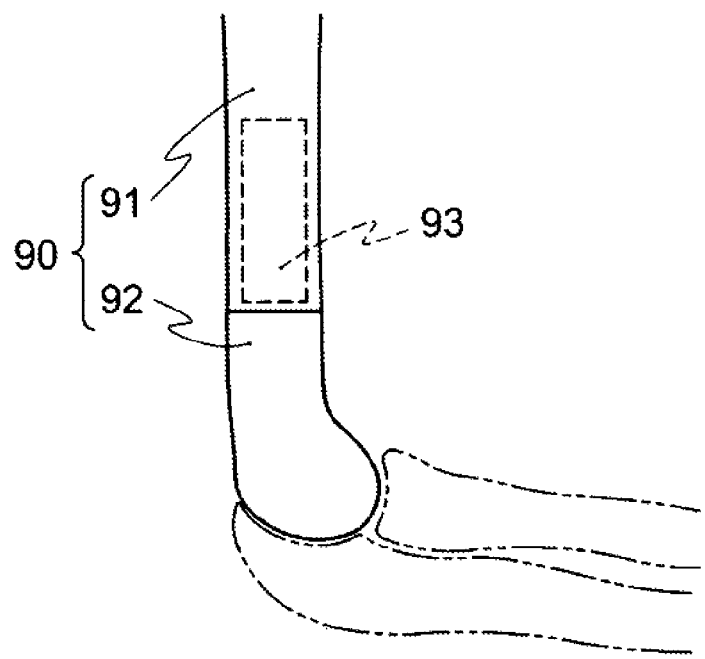
FIG. 26 A schematic side view of a proximal fragment member and a distal fragment member of a humerus member of an anatomical model for training aid for learning a reduction technique for supracondylar fracture of the humerus according to seventh embodiment of the present invention being in a normal connection status.
Figure 27:
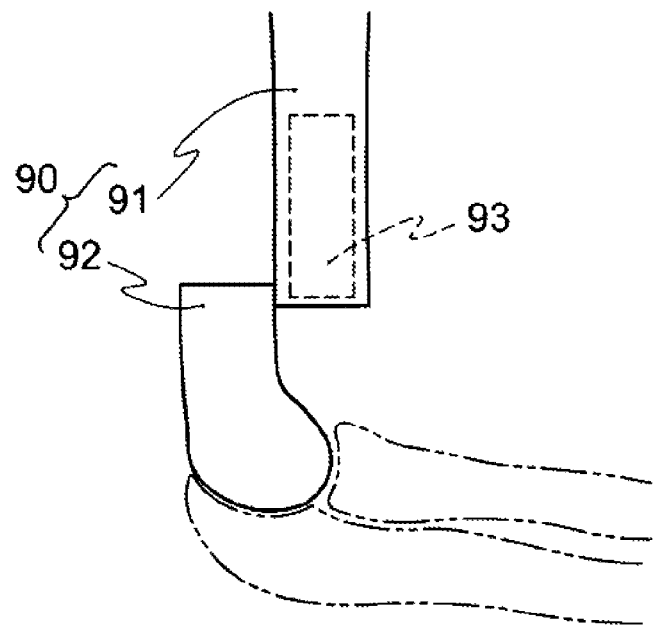
FIG. 27 A schematic lateral cross-sectional view of the proximal fragment member of FIG. 26.
Figure 28:
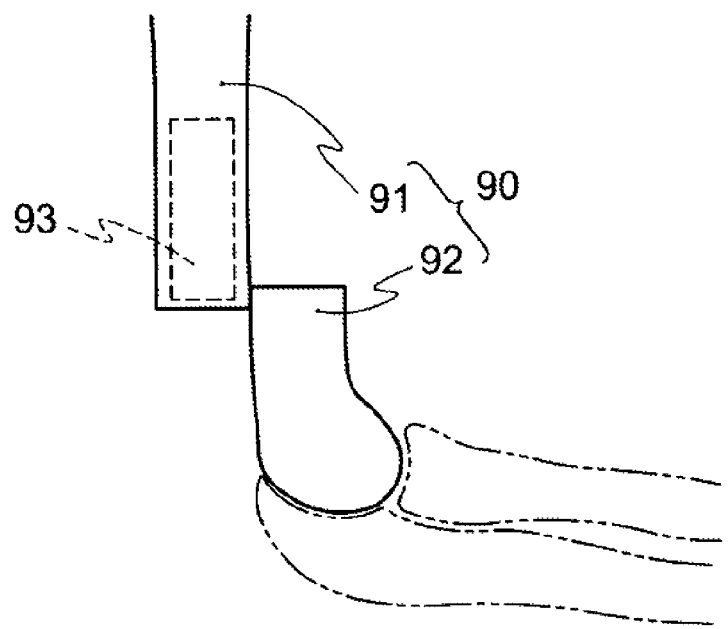
FIG. 28 A schematic side view of the proximal fragment member and distal fragment member of FIG. 26 being in a status of an extension type fracture.
Figure 29:
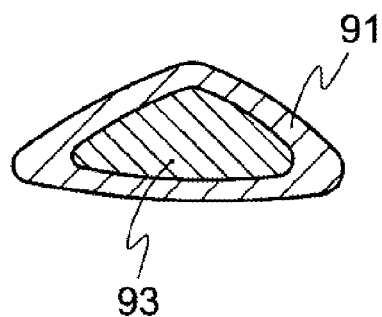
FIG. 29 A schematic side view of the proximal fragment member and the distal fragment member of FIG. 26 being in a status of a flexion type fracture.

FIG. 26 is a schematic side view of a proximal fragment member and a distal fragment member of a humerus member of the anatomical model for training aid for learning the reduction technique for supracondylar fracture of humerus according to the seventh embodiment of the present invention being in a normal connection status, and FIG. 27 is a schematic lateral cross-sectional view of the proximal fragment member of FIG. 26, FIG. 28 is a schematic side view of the proximal fragment member and the distal fragment member of FIG. 26 being in a status of the extension type fracture, and FIG. 29 is a schematic side view of the proximal fragment member and the distal fragment member of FIG. 26 being in a status of the flexion type fracture. The anatomical model for training aid for learning the reduction technique for supracondylar fracture of humerus according to the seventh embodiment and the method for learning the reduction technique using the anatomical model for training aid are basically same as the ones according to the first embodiment explained earlier, and thus they will be described with a focus on their differences.

As shown in those drawings, the anatomical model for training aid for learning the reduction technique for supracondylar fracture of humerus according to the seventh embodiment (hereinafter referred to as anatomical model for training aid) comprises a humerus member 90, a forearm bone member (not illustrated) and a carpal, metacarpal and phalange member (not illustrated), wherein the humerus member 90 is composed of a proximal fragment member 91 and a distal fragment member 92, and the proximal fragment member 91 has a magnet 93 inside thereof on the side of its separation surface.

Although not especially illustrated, the humerus member 90, the forearm bone member and the carpal, metacarpal and phalange member respectively have shapes similar to a humerus, a forearm bone and carpals, metacarpals and phalanges, and have arrangement relationship similar to human bones. In addition, the humerus member 90 and the forearm bone member are movably connected to each other, the forearm bone member and the carpal, metacarpal and phalange member are movably connected to each other, and each member is configured to have the same range of movability same as the range of motion of a human body.

As shown in FIG. 26, the humerus member 90 is composed of the proximal fragment member 91 and the distal fragment member 92, and the proximal fragment member 91 and the distal fragment member 92 are separated above and in the vicinity of an epicondylus medialis humeri and an epicondylus lateralis humeri at the distal end of the humerus. In order to reproduce the supracondylar fracture of humerus more precisely, it is preferred that the separation is located above and within 2 cm proximal to the epicondylus medialis humeri and the epicondylus lateralis humeri at the distal end of the humerus. The separation surface between the proximal fragment member 91 and the distal fragment member 92 is substantially planar, and putting both members together with one member on the other makes the humerus member 90 where a humerus in a normal condition is reproduced. In this regard, the separation surface is not limited to a plane, but it can be a surface with concavity and convexity.

The proximal fragment member 91 can be made of a magnetic material such as iron and stainless or synthetic resin, and it can also be made of combinations thereof.

As shown in FIG. 26 and FIG. 27, the proximal fragment member 91 has a magnet 93 inside in the vicinity of its distal end on the separation surface side. The magnet 93 is contained in a hole formed on the separation surface of the proximal fragment member 91, which is sealed with a cover material (not illustrated). Mounting of a magnet to the proximal fragment member is not limited to this, and various mounting methods can be adopted such as fixing from outside of the proximal fragment member using a known fixing means such as a screw.

Moreover, the distal fragment member 92 is entirely formed of a magnetic material such as iron and stainless, but not limited thereto. The distal fragment member 92 can be formed from synthetic resin such as polyvinyl chloride and be provided with magnetic material member such as iron and stainless fixed on or in the vicinity of the separation surface separating from the proximal fragment member 91. Accordingly, attraction force of the magnet prevents the proximal fragment member 91 and the distal fragment member 92 from being apart when the distal fragment member 92 is displaced relative to the proximal fragment member 91, and thus the extension type fracture and the flexion type fracture of supracondylar fracture of humerus can be reproduced on the anatomical model for training aid.

Type, magnet force, shape or size of the magnet 93 is not especially limited, and various magnets that allow displacement within such range to keep the proximal fragment member 91 and the distal fragment member 92 from being apart can be used.

Next, the method for learning the reduction technique for supracondylar fracture of humerus using the anatomical model for training aid according to this embodiment will be described.

First, the bone members of the anatomical model for training aid are arranged in an abnormal connection status, that is, a status similar to supracondylar fracture of humerus of a human body. In this embodiment, the separation surface of the distal fragment member 92 is misaligned from the separation surface of the proximal fragment member 91. At this point, by shifting the distal fragment member 92 posteriorly to the proximal fragment member 91 (to the left in FIG. 26), a status of a displaced extension-type fractures can be reproduced as shown in FIG. 28, and conversely, by shifting the distal fragment member 92 anteriorly to the proximal fragment member 91 (to the right in FIG. 26), a status of displaced flexion type of fracture can be reproduced as shown in FIG. 29. Because a magnet 93 is contained inside in the vicinity of the separation surface of the proximal fragment member 91 and the distal fragment member 92 is formed of a magnetic material, attraction force of the magnet keeps the proximal the bone fragment member 91 and the distal fragment member 92 in the abnormal connection status but from being apart. This allows a status similar to supracondylar fracture of humerus of a human body to be reproduced on the anatomical model for training aid.

Next, the proximal fragment member 91 is fixed and at least one or more reduction performance from traction, medial movement, lateral movement, internal rotation, external rotation, anterior movement, posterior movement are applied to the distal fragment member 92 such that the proximal fragment member 91 and the distal fragment member 92 arranged in the abnormal connection status are moved into the normal connection status, that is, a status where they have the same shape as a normal humerus.

By configuring the anatomical model for training aid as described above and by learning the reduction technique using the anatomical model for training aid, function and effect of the present invention can be exerted in the same manner as the first embodiment.

An anatomical model for training aid for learning a reduction technique for supracondylar fracture of humerus according to an eighth embodiment and a method for learning the reduction technique using the anatomical model for training aid are basically same as the ones according to the seventh embodiment explained above, and thus they will be described with a focus on their differences.

Although not especially illustrated, the anatomical model for training aid for learning the reduction technique for supracondylar fracture of humerus according to the eighth embodiment (hereinafter referred to as anatomical model for training aid) is different from the one according to the seventh embodiment in that a proximal fragment member of a humerus member is formed of epoxy resin containing neodymium magnet powder. Neodymium magnet powder has only to be contained in epoxy resin to such a degree that the proximal fragment member is attracted to the distal fragment member. By configuring the proximal fragment member of the humerus member in this manner, the same function and effect as the seventh embodiment can be exerted.

A ninth embodiment of the present invention relates to an anatomical model for training aid which makes it possible to learn a reduction technique for anterior temporomandibular joint dislocation and a method for learning the reduction technique using the anatomical model for training aid. Before starting to describe the ninth embodiment, occurrence mechanism, symptoms and reduction method of anterior temporomandibular joint dislocation will be explained briefly.

A skull is a part of a skeleton located at the uppermost part of a body, and it is not made of a single bone, but composed of 23 skull bones of 15 types if disassembled. Connections in the skull are made securely, except for a mandibular bone and a hyoid bone, and the mandibular bone functions in a movable connection with the skull by a temporomandibular joint. The temporomandibular joint is a joint between a temporal bone and the mandibular bone, where a mandibular fossa of the temporal bone and a mandibular condyle of the mandibular bone are coupled, and there are an articular tubercle prominent at an anterior edge of the mandibular fossa and an articular disk, a fibrous disk, between the mandibular fossa and the mandibular condyle.

(Occurrence Mechanism and Symptoms)

Temporomandibular joint dislocation is a condition of as is referred to as a jaw out of place, where a structure of the mandibular condyle, the mandibular fossa, the articular tubercle and the articular disk, etc. of the temporomandibular joint loses normal relative positional relationship and comes out of physiological range of motion such that their functions are disabled, and normally, the mandibular condyle largely comes off the mandibular fossa, escaping and displaced anteriorly to the articular tubercle. It is caused by opening a mouse excessively such as during yawning or an external force accompanying a fracture, etc. Depending on its direction, dislocation can be classified into anterior dislocation (bilateral dislocation or unilateral dislocation), posterior dislocation, sideways dislocation and the like, but posterior and sideways dislocations are associated with fractures, and normally, anterior dislocation is mostly the case.

(Reduction Method)

Methods of reducing anterior dislocation include an intraoral approach and an extraoral approach. In the case of the intraoral approach, (1) a patient is placed in the supine position or in the seated position, with the patient's head part held in the prone position. (2) A practitioner wraps gauze around both of his thumbs and puts them into the mouth of the patient, places his pads of the thumbs on right and left molar teeth, with his other four fingers griping the mandibular bone from outside the mouth. (3) By slowly pressing the molar teeth downward with both of his thumb pads and further pressing them in a manner to guiding them backward without easing the pressure, a feel of the articular head being slightly withdrawn into (the mandibular fossa) is sensed. At this point, by manipulating the gripped lower mandible anterosuperiorly in a manner to scoop it up, the dislocation is reduced. In the case of the extraoral approach, (1) a patient is placed in the supine position or the seated position. (2) If the patient is in the supine position, a practitioner sits on his knees with the patient's back of the head on his lap, bends the patient's head forward, and grips the area from a mandibular angle to a mandibular body part of the patient with his right and left thenar eminences in a manner to closely attach. If the patient is placed in the seated position, the practitioner stands behind the patient so that his body contacts the back part of the patient. Next, he grips the area from the mandibular angle to the mandibular body part with his right and left thenar eminences in a manner to closely attach, and bends the patient's head forward. (3) As he slowly presses the mandibular body anteroinferiorly without easing the grip of his thenar eminences, the mouse opens more widely and a sense of resistance increases. At this point, by elevating the jaw part with his other fingers and manipulating to close the mouth, the dislocation is reduced.

Figure 30:
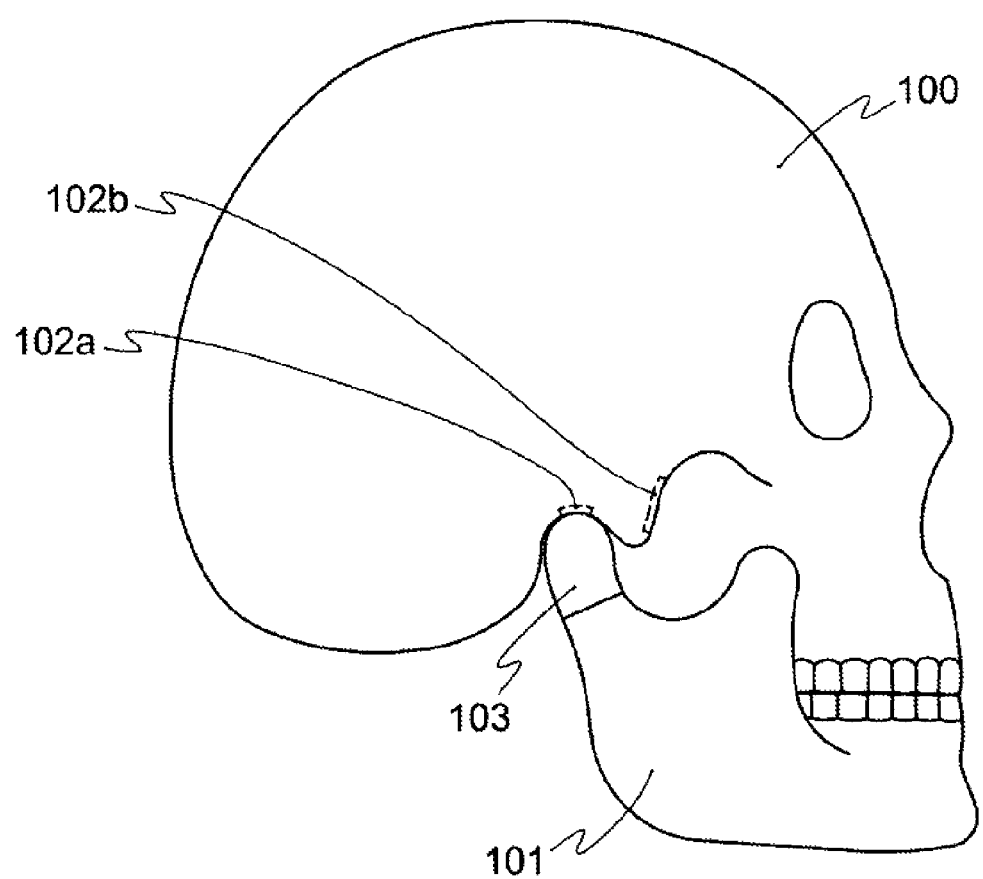
FIG. 30 A schematic side view of a connected skull member and a mandibular member of an anatomical model for training aid for learning a reduction technique for anterior temporomandibular joint dislocation according to a ninth embodiment of the present invention being in a normal connection status.
Figure 31:
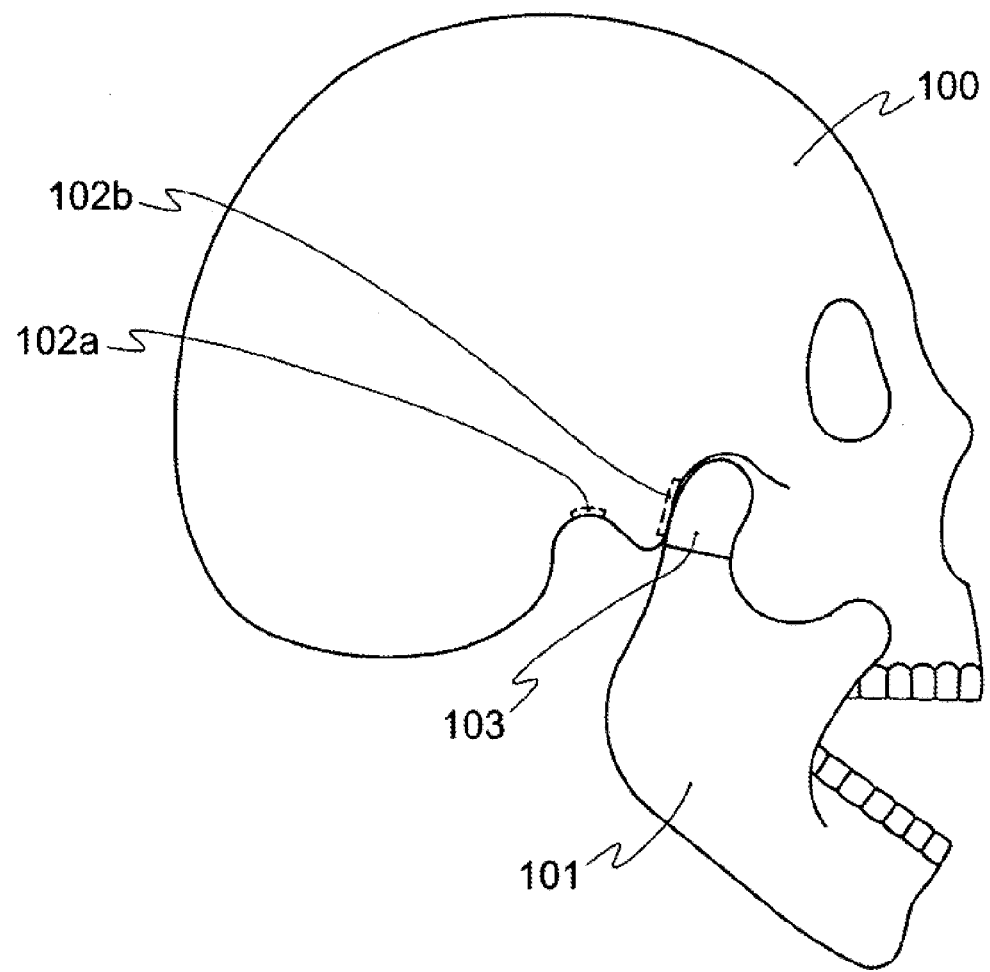
FIG. 31 A schematic side view of the connected skull member and the mandibular member of FIG. 30 being in a status of anterior temporomandibular joint dislocation.

FIG. 30 is a schematic side view of a connected skull member and a mandibular member of the anatomical model for training aid for learning the reduction technique for anterior temporomandibular joint dislocation according to the ninth embodiment of the present invention in a normal connection status, and FIG. 31 is a schematic side view of the connected skull member and the mandibular member of FIG. 30 in a status of anterior temporomandibular joint dislocation. The anatomical model for training aid for learning the reduction technique for anterior temporomandibular joint dislocation according to the ninth embodiment and the method for learning the reduction technique using the anatomical model for training aid are basically same as the ones according to the first embodiment explained above, and thus they will be described with a focus on their differences.

As shown in FIG. 30 and FIG. 31, the anatomical model for training aid for learning the reduction technique for anterior temporomandibular joint dislocation according to the ninth embodiment (hereinafter referred to as anatomical model for training aid) is provided with the connected skull member 100 and the mandibular member 101. In this regard, the connected skull member 100 has a shape similar to the one formed by bones excluding the mandibular bone and the hyoid bone among 23 skull bones of 15 types firmly coupled to one another. In addition, the mandibular member 101 has a shape similar to the mandibular bone. Those bone members have arrangement relationship similar to human bones. Furthermore, the connected skull member 100 and the mandibular member 101 are movably connected to each other by attraction force of a magnet that will be described below, and each member is configured in a manner to have the same range of movability as the range of motion of a human body.

Although not especially illustrated, a soft member being made of rubber material in a form of a so-called mask covering a facial surface and head part, especially having a mouth opening and being removable with respect to the bone members is suitably used.

The connected skull member 100 has magnets 102a, 102b respectively fixed at two sites corresponding to the mandibular fossa and an anterior articular tubercle of the temporal bone. A method of mounting the magnets 102a, 102b to the connected skull member 100 is not especially limited, and various mounting methods can be employed such as fixing from outside of the connected skull member 100 by using a known fixing means such as a screw, but it is preferred that the magnets 102a, 102b are fixed by being embedded into concave portions formed on the connected skull member 100 to keep them from protruding from the bone member. The connected skull member 100 can be made of a magnetic material such as iron and stainless or synthetic resin, but it is preferred that the connected skull member 100 is made of synthetic resin, if the magnets 102a, 102b are mounted thereto.

In addition, the mandibular member 101 has a site corresponding to the mandibular condyle, i.e. a site contacting the mandibular fossa and the anterior articular tubercle of the connected skull member 100, formed of a magnetic material member 103 such as iron and stainless, etc. In this regard, a method for mounting the magnetic material member 103 to the mandibular member 101 is not limited to this, and the mandibular member 101 can be formed from synthetic resin such as polyvinyl chloride, with a magnetic material member such as iron and stainless fixed to its site contacting the mandibular fossa and the anterior articular tubercle of the connected skull member 100. Accordingly, attraction force of the magnet keeps the mandibular member 101 and the connected skull member 100 from being apart when displacing the mandibular member 101 relative to the connected skull member 100, and thus anterior temporomandibular joint dislocation can be reproduced on the anatomical model for training aid.

Type, magnet force, shape or size of the magnets 102a, 102b is not especially limited, and various magnets that allow displacement within such range to keep the mandibular member 101 and the connected skull member 100 from being apart can be used.

Next, the method for learning the reduction technique for anterior temporomandibular joint dislocation using the anatomical model for training aid according to this embodiment will be described.

First, the bone members of the anatomical model for training aid are arranged in an abnormal connection status, that is, a status similar to anterior temporomandibular joint dislocation of a human body. In this embodiment, as shown in FIG. 31, the mandibular member 101 is misaligned from the connected skull member 100 anteriorly. Because the magnet 102b is fixed at the anterior articular tubercle of the connected skull member 100 and the mandibular member 101 has a site corresponding to the mandibular condyle contacting the magnet 102b, formed of a magnetic material member 103, attraction force of the magnet keeps the mandibular member 101 and the connected skull member 100 in the abnormal connection status but from being apart. Accordingly, a status similar to anterior temporomandibular joint dislocation of a human body is reproduced on the anatomical model for training aid.

Next, by applying at least one or more reduction performances from anterior, posterior, superior, inferior, rightward and leftward movements to the mandibular member 101 relative to the connected skull member 100, or by applying at least one or more reduction performances from rightward movement, leftward movement, superior movement, inferior movement, rightward lateral flexion and leftward lateral flexion to the facial surface part of the connected skull member 100 relative to the mandibular member 101, the connected skull member 100 and the mandibular member 101 arranged in the abnormal connection status of anterior temporomandibular joint dislocation are moved into the normal connection status, i.e. a state where they have the same shape as a normal temporomandibular joint. Then the magnetic material member 103 of the mandibular member 101 is attracted to the magnet 102a fixed in the vicinity of the mandibular fossa of the connected skull member 100 and the connected skull member 100 and the mandibular member 101 are stabilized in a normal status.

By configuring the anatomical model for training aid as described above and learning the reduction technique by using the anatomical model for training aid, the function and effect of the present invention can be exerted in the same manner as the first embodiment.

Figure 32:
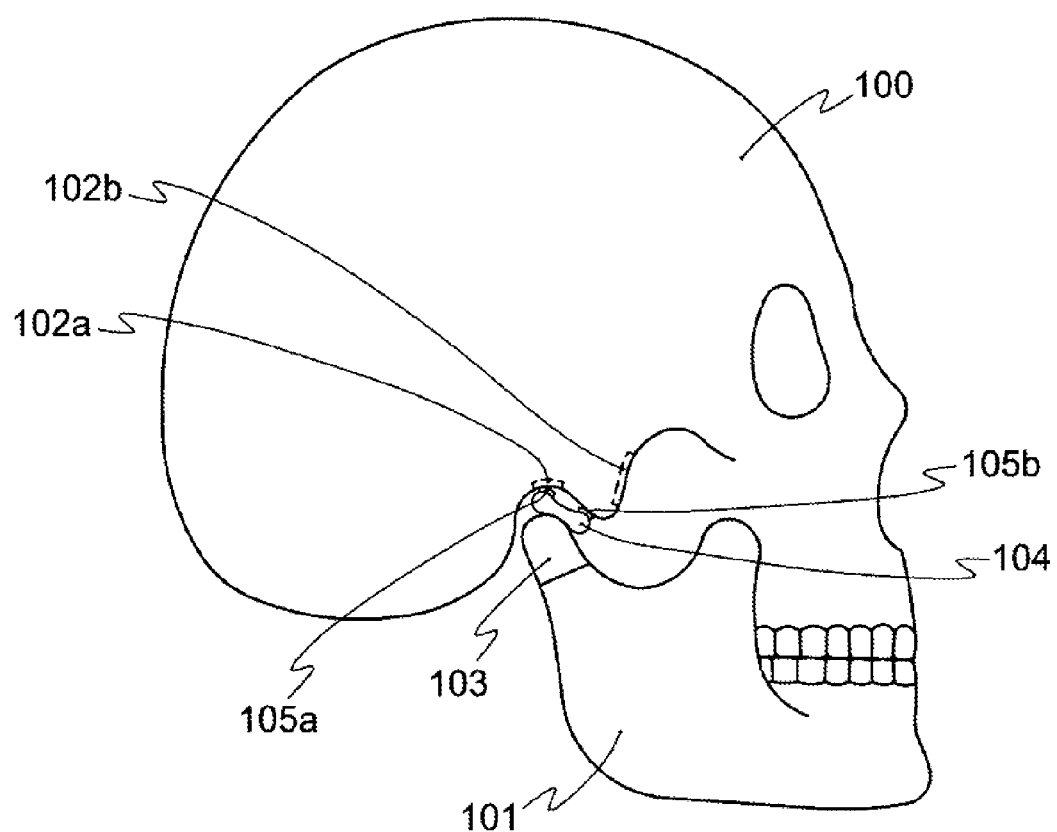
FIG. 32 A schematic side view of the connected skull member and an articular disc member of an anatomical model for training aid for learning a reduction technique for anterior temporomandibular joint dislocation according to a tenth embodiment of the present invention being in a normal connection status.
Figure 33:
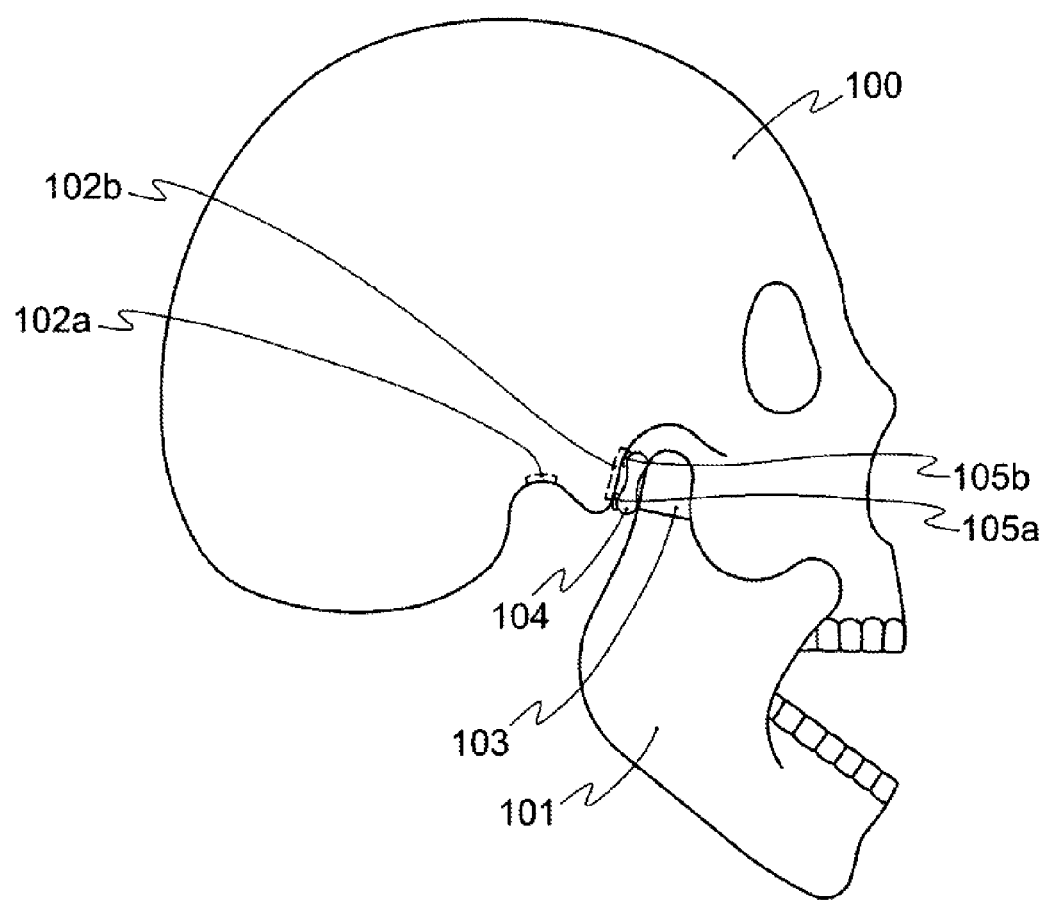
FIG. 33 A schematic side view of the connected skull member and the articular disc member of FIG. 32 being in a status of anterior temporomandibular joint dislocation.

FIG. 32 is a schematic side view of a connected skull member and an articular disc member of an anatomical model for training aid for learning a reduction technique for anterior temporomandibular joint dislocation according to a tenth embodiment of the present invention in a normal connection status and FIG. 33 is a schematic side view of the connected skull member and the articular disc member of FIG. 32 in a status of anterior temporomandibular joint dislocation.

The anatomical model for training aid for learning the reduction technique for anterior temporomandibular joint dislocation according to the tenth embodiment and a method for learning the reduction technique using the anatomical model for training aid are basically the same as the ones according to the ninth embodiment described earlier, and thus they will be described with a focus on their differences.

As shown in FIG. 32 and FIG. 33, the anatomical model for training aid for learning the reduction technique for anterior temporomandibular joint dislocation according to the tenth embodiment (hereinafter referred to as anatomical model for training aid) is different from the one according to the ninth embodiment in that the articular disc member 104 is further provided between the connected skull member 100 and a mandibular member 101.

The articular disc member 104 has a shape similar to an articular disk having a thick posterior portion, a narrowed middle portion and a thick anterior portion, and because the articular disk is fibrous tissue with elasticity, it is preferred that the articular disc member 104 is formed of flexible material such as rubber.

The articular disc member 104 has magnetic material members 105a, 105b fixed on its thick posterior portion and thick anterior portion on the side of the connected skull member 100. The magnetic material members 105a, 105b can be magnets. Accordingly, the connected skull member 100 and the articular disc member 104 are movably connected to each other. On the other hand, the magnetic material members 105a, 105b are not fixed to the thick posterior portion and the thick anterior portion of the articular disc member 104 on the side of the mandibular member 101. Therefore, the mandibular member 101 and the articular disc member 104 are in a status where they can move independently from each other. In addition, it is preferred that the magnetic material members 105a, 105b are not fixed on the middle narrowed portion. Accordingly, the articular disc member 104 can be bent over at the narrowed middle portion having flexibility.

By configuring in this manner, as shown in FIG. 33, misaligning the mandibular member 101 from the connected skull member 100 anteriorly allows the articular disc member 104 to shift anteriorly as well, and the magnet 102b of the anterior articular tubercle of the connected skull member 100 and the magnetic material members 105a, 105b of the articular disc member 104 are secured by attraction force of the magnet, so as to keep the articular disc member 104 and the connected skull member 100 in the abnormal connection status but from being apart. Accordingly, a status similar to anterior temporomandibular joint dislocation of a human body is reproduced on the anatomical model for training aid. Moreover, upon moving the articular disc member 104 and the connected skull member 100 into the normal connection status, in other words, a status where they have the same shape as a normal temporomandibular joint, by applying the aforementioned reduction performances, the magnetic material members 105a, 105b of the articular disc member 104 are attracted to the magnet 102a fixed in the vicinity of a mandibular fossa of the connected skull member 100 so that the connected skull member 100 and the articular disc member 104 are stabilized in the normal status.

As described above, according to the anatomical model for training aid according to this embodiment, reduction performances can be applied to the connected skull member 100 and the mandibular member 101 with the articular disc member 104 removed during the reduction performance. Moreover, for learning the mechanism inhibiting anterior mandibular joint dislocation and its reduction, it is possible to reproduce the situation where the articular disc member 104 and the mandibular condyle of the mandibular member 101 are displaced anteriorly beyond the articular tubercle of the connected skull member 100 and the reduction is performed posteriorly during the dislocation and its reduction, by mounting the articular disc member 104 between the connected skull member 100 and the mandibular member 101. Therefore, a highly practical method for learning the reduction technique for anterior temporomandibular joint dislocation can be provided.

By the way, in each of the above embodiments, the magnets and/or the magnetic materials are mounted on or contained in the bone members formed beforehand, but not limited thereto. A bone member formed with a magnet and/or a magnetic material embedded therein by pouring synthetic resin into a mold where the magnet has been placed for forming the bone member can be used as well. This makes a metal part for mounting the magnet and/or the magnetic material unnecessary, makes it easy to manufacture and allows the shape of the bone member to be similar to the shape of a skeleton. Furthermore, if the magnet and/or the magnetic material is buried inside the bone member, the magnet and/or the magnetic material is in a protected status without being exposed on the surface of the bone member, and thus there is an advantage of becoming hard to crack. A method for manufacturing such bone member is not especially limited, but its examples include a method of forming the same by temporarily securing the magnet and/or the magnetic material with high-viscosity synthetic resin at a desired position in a mold and then pouring low-viscosity synthetic resin.

EXPLANATION OF SYMBOLS

1 Anatomical model for training aid (for learning reduction techniques)
2 Soft member
3 Bone member
6a, 6b Attachment parts
10 Humerus member
11 Scapula member
12 Clavicle member
16 Rib member
17 Sternum member
20 Bone head part
21 Glenoid fossa
25a, 25b Proximal humerus members
26 Humerus shaft member
27 Magnet
28 Engagement Convex portion
29 Engagement Concave portion
30 Articular labrum member
31 Magnetic material
35 Rotatable fixture
40 Semicircular portion
41 Axial portion
42 Pin
45 Aperture
46 Elongate hole
50 Engagement member
55 Main body of humerus member
56 Bone head member
60 Proximal fragment member
61 Distal fragment member
62 Rotatable fixture
65 Magnet
66, 67 Plate-like bodies
70 Separation surface
75 Convex portion
76 Concave portion
80 Cap
81 Cap
90 Humerus member
91 Proximal fragment member 92 Distal fragment member
93 Magnet
100 Connected skull member
101 Mandibular member
102a, 102b Magnets
103 Magnetic material member
104 Articular disc member
105a, 105b Magnetic material members

What is claimed is:

1. An anatomical model for training aid for learning a reduction technique for shoulder joint dislocation which comprises hard bone members comprising at least a humerus member, a scapula member, a clavicle member and a thorax member having arrangement relationship similar to human bones, wherein
the humerus member and scapula member are adjacent to each other,
a head of the humerus member is provided with a magnet or a magnetic material while a glenoid fossa of the scapula member is at least partially formed of a magnet or the head of humerus member is provided with a magnet while the glenoid fossa of the scapula member is at least partially provided with a magnetic material,
the scapula member and the clavicle member are fixed coupled, the clavicle member and the thorax member are movably connected to each other, the scapula member and the thorax member are movably connected to each other or fixed coupled,
there are at least two connection statuses including a normal connection status where the humerus member and the scapula member are connected in a status similar to normal connection relationship of human bones, and an abnormal connection status where they are connected in a status similar to shoulder joint dislocation, and
the magnet or the magnetic material is provided at a site adjacent to the head of the humerus member in the abnormal connection status when the magnet is provided at the head of the humerus member, or
the magnet is provided at a site adjacent to the head of the humerus member in the abnormal connection status when the magnet material is provided at the head of the humerus member.

2. The anatomical model of claim 1, wherein said anatomical model is a whole-body anatomical model.

3. The anatomical model of claim 1, further comprising a soft member covering an upper half of said whole-body anatomical model.

4. The anatomical model of claim 1, further comprising a spherical space formed inside said head of said humerus member, wherein said magnet is arranged inside said spherical space.

5. The anatomical model of claim 1, wherein said abnormal connection status is a status where said head of said humerus member is shifted anteriorly, posteriorly, or inferiorly to said glenoid fossa of said scapula member.

* * * * *